(12) United States Patent
Kakaiya et al.

(10) Patent No.: US 11,907,744 B2
(45) Date of Patent: Feb. 20, 2024

(54) SYSTEM, APPARATUS AND METHOD FOR ENABLING FINE-GRAIN QUALITY OF SERVICE OR RATE CONTROL FOR WORK SUBMISSIONS

(71) Applicant: Intel Corporation, Santa Clara, CA (US)

(72) Inventors: Utkarsh Y. Kakaiya, Folsom, CA (US); Sanjay K. Kumar, Hillsboro, OR (US); Philip Lantz, Cornelius, OR (US); Gilbert Neiger, Portland, OR (US); Rajesh Sankaran, Portland, OR (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 16/911,445

(22) Filed: Jun. 25, 2020

(65) Prior Publication Data

US 2021/0406055 A1 Dec. 30, 2021

(51) Int. Cl.
*G06F 9/455* (2018.01)
*G06F 9/30* (2018.01)
(Continued)

(52) U.S. Cl.
CPC ...... *G06F 9/45558* (2013.01); *G06F 9/30098* (2013.01); *G06F 9/5005* (2013.01);
(Continued)

(58) Field of Classification Search
CPC ............. G06F 9/45558; G06F 9/30098; G06F 9/5005; G06F 9/546; G06F 2009/4557; G06F 2009/45579
See application file for complete search history.

(56) References Cited

U.S. PATENT DOCUMENTS

2009/0210741 A1* 8/2009 Yamaoka ............... G06F 9/5094
713/600
2014/0379922 A1* 12/2014 Xiao ..................... H04L 47/215
709/226
(Continued)

FOREIGN PATENT DOCUMENTS

EP 3343367 A1 7/2018
WO 2018125250 A1 7/2018
WO 2018152688 A1 8/2018

OTHER PUBLICATIONS

European Patent Office, Search Report dated May 12, 2021 in European Patent Application No. 20212490.5 (13 pages).
(Continued)

*Primary Examiner* — Emerson C Puente
*Assistant Examiner* — Jonathan R Labud
(74) *Attorney, Agent, or Firm* — Trop, Pruner & Hu, P.C.

(57) ABSTRACT

In one embodiment, a processor comprises: a first configuration register to store quality of service (QoS) information for a process address space identifier (PASID) value associated with a first process; and an execution circuit coupled to the first configuration register, where the execution circuit, in response to a first instruction, is to obtain command data from a first location identified in a source operand of the first instruction, insert the QoS information and the PASID value into the command data, and send a request comprising the command data to a device coupled to the processor, to enable the device to use the QoS information of a plurality of requests to manage sharing between a plurality of processes. Other embodiments are described and claimed.

13 Claims, 18 Drawing Sheets

(51) Int. Cl.
  *G06F 9/50* (2006.01)
  *G06F 9/54* (2006.01)
(52) U.S. Cl.
  CPC ...... *G06F 9/546* (2013.01); *G06F 2009/4557* (2013.01); *G06F 2009/45579* (2013.01)

(56) References Cited

U.S. PATENT DOCUMENTS

| | | | |
|---|---|---|---|
| 2017/0161669 A1* | 6/2017 | Chen | G06Q 10/063112 |
| 2018/0278493 A1* | 9/2018 | Guim Bernat | H04L 5/0055 |
| 2019/0042463 A1* | 2/2019 | Shanbhogue | G06F 9/30145 |
| 2019/0243683 A1* | 8/2019 | Botelho | G06F 21/44 |
| 2019/0370050 A1 | 12/2019 | Kumar et al. | |
| 2020/0004703 A1 | 1/2020 | Sankaran et al. | |
| 2020/0012530 A1 | 1/2020 | Kakaiya | |
| 2020/0117624 A1 | 4/2020 | Kumar et al. | |
| 2020/0278935 A1* | 9/2020 | Borikar | G06F 12/12 |

OTHER PUBLICATIONS

Intel Corporation, "Intel® Data Streaming Accelerator Preliminary Architecture Specification," Nov. 2019, 125 pages.
United States Patent Office, Final Office Action dated Mar. 1, 2022 in U.S. Appl. No. 16/911,441 (10 pages).
U.S. Appl. No. 16/911,441, filed Jun. 25, 2020 entitled "System, Apparatus and Method for Fine-Grain Address Space Selection in a Processor," in the name of Utkarsh Y. Kakaiya, et al.
United States Patent Office, Office Action dated Aug. 30, 2021 in U.S. Appl. No. 16/911,441 (16 pages).
United States Patent Office, Response to Office Action filed Nov. 29, 2021 in U.S. Appl. No. 16/911,441 (9 pages).
United States Patent Office, Notice of Allowance dated May 4, 2022 in U.S. Appl. No. 16/911,441 (13 pages).
United States Patent Office, Response to Final Office Action filed Apr. 25, 2022 in U.S. Appl. No. 16/911,441 (7 pages).
United States Patent Office, Non-Final Office Action dated Sep. 14, 2023 in U.S. Appl. No. 17/891,180 (36 pages).

* cited by examiner

SYSTEM, APPARATUS AND METHOD FOR ENABLING FINE-GRAIN QUALITY OF SERVICE OR RATE CONTROL FOR WORK SUBMISSIONS

TECHNICAL FIELD

Embodiments relate to execution of instructions in processors.

BACKGROUND

With a shared work queue or enqueue-based submission model, a single hardware interface may be shared with up to one million applications/drivers/virtual machines (VMs)/containers. It is not scalable for devices or accelerators to store/track quality of service (QoS) information associated with such a large number of clients. As such, devices typically provide at most two levels or classes of service. A given scheme may work to ensure a dedicated quota for privileged (Ring-0) clients (as they are using unlimited portals) on a bare-metal environment. However this arrangement does not ensure a fair share among unprivileged (Ring-3) clients. Moreover, this scheme does not scale well to virtualized environments, in which unlimited portals are kept in control of host (or root partition), and limited portals are used for both Ring-0 and Ring-3 submissions from the guest. Hence, there is no way to ensure fair sharing among different VMs/containers.

DETAILED DESCRIPTION

Figure 1:
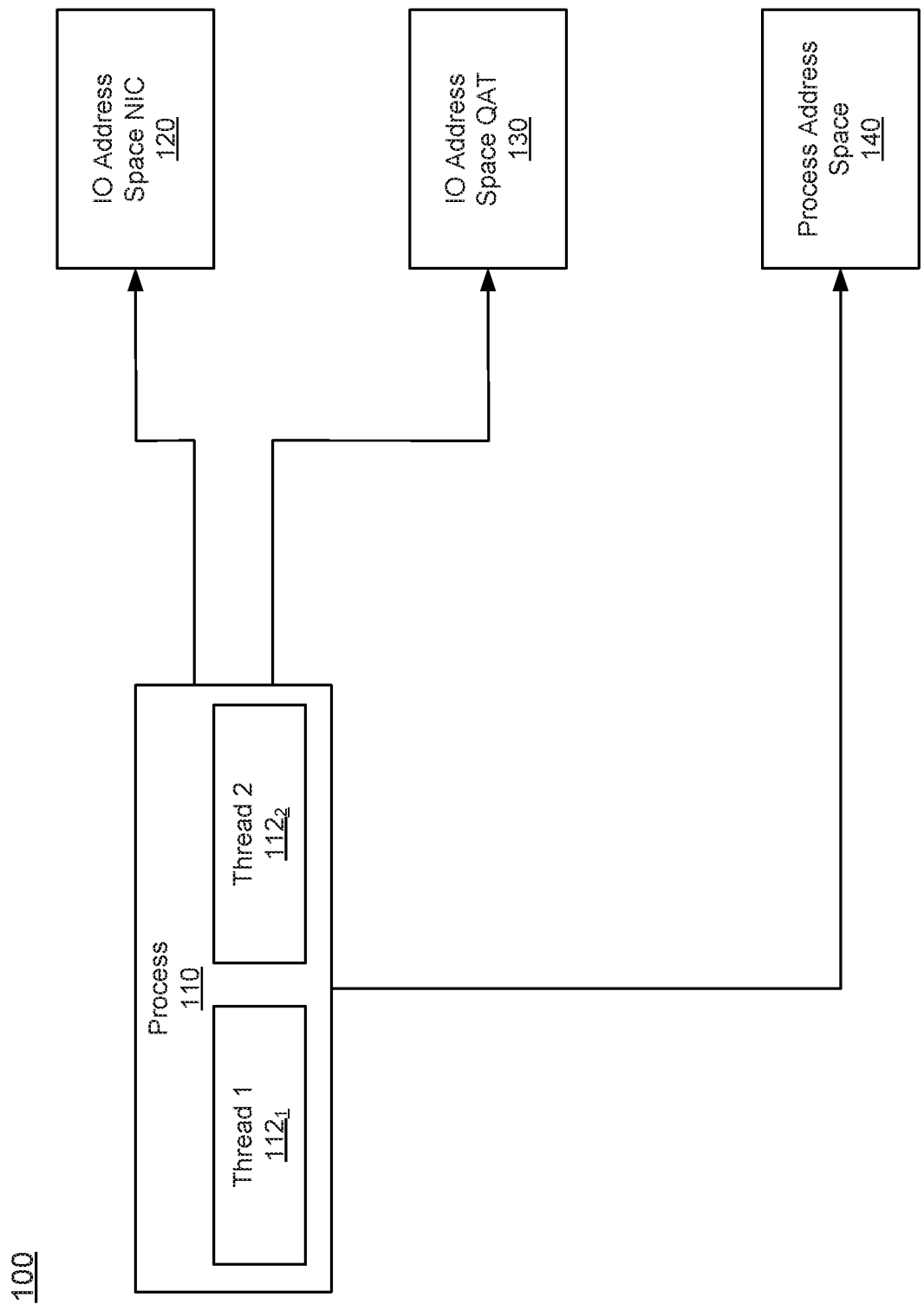
FIG. 1 is a block diagram of a process interaction with multiple address spaces in accordance with an embodiment.

In various embodiments, an enqueue submission model used to send requests to a device such as a scalable device is adapted to carry quality of service (QoS) information (e.g., QoS class, QoS priority etc.) along with enqueue store command data, to allow QoS-based handling in a destination. Note that the QoS settings may be associated with a given process address space identifier (PASID) to enable a destination (e.g., a given scalable device) to enforce QoS on a process basis, based at least in part on this information.

In other embodiments, to ease complexity on the device (destination) side, a processor or other requester may be configured with rate control for enqueue-based submissions to allow throttling at a PASID granularity, thereby ensuring a fair share of a hardware quota. In this way, downstream resources may be more fairly shared among a large number (e.g., up to 1 million) of clients (e.g., drivers/containers/apps/VMs) without adding complexity on the device side.

QoS may be implemented in a processor-based system that enables multiple non-privileged software clients to issue work requests to shared work queues in devices coupled to one or more processors of the system. Such requests may be issued to one or more devices via a common or shared hardware interface. As examples, the software clients may include drivers, applications, containers, or virtual machines (VMs) that may share the same hardware interface. In this model, a process space address identifier (PASID) is used to identify an address space associated with a given work request. For enabling direct ring-3 submission, system software may allocate a unique PASID for each process, which may be stored in a configuration register such as a given model specific register (MSR), e.g., a PASID MSR.

This programming enables a given software client to issue requests, including work requests that may include an enqueue command instruction, details of which are described herein, to write command data to a destination location within the device. To enable the software client to access shared virtual memory of multiple address spaces associated with different PASIDs, embodiments provide processor-internal hardware structures, user-level instructions of an instruction set architecture, and techniques to enable more efficient issuance of work requests including register writes to particular device registers as described herein.

When a client is interacting with multiple non-SVM capable devices, it uses a different PASID for each device, signifying an input/output (I/O) virtual address space associated with the device. Furthermore, if the application is interacting with a mixture of SVM and non-SVM capable devices, different PASIDs are used to identify I/O vs. process address space. Embodiments enable such usage. In addition, for situations where there is not a SVM, e.g., a network interface controller (NIC), non-volatile memory express (NVMe) or so forth, or where a cloud services provider does not enable SVM, embodiments enable use of enqueue command instructions described herein by non-privileged clients using sub-process address spaces.

Referring now to FIG. 1, shown is a block diagram of a process interaction with multiple address spaces in accordance with an embodiment. As shown in FIG. 1, within a computing system 100, a process 110 is in execution. In embodiments herein, assume that process 110 is a non-privileged client software such as application, driver, VM or so forth. As illustrated, process 110 itself includes multiple threads, namely a first thread $112_1$ and a second thread $112_2$. Process 110 interacts with a NIC 120 using PASID X, and interacts with an Intel® Quick Assist Technology (QAT) device 130 using PASID Y. And as further illustrated, process 110 (and its included threads 112) also may seek to access an SVM-capable Data Streaming Accelerator (DSA) device 140 with PASID Z.

With embodiments herein, enqueue command-based instructions and hardware structures may be used to enable efficient access to multiple address spaces, leveraging PASID and QoS information of the different address spaces. If thread $112_1$ is receiving a packet from NIC 120, and copying it using DSA device 140, without an embodiment an MSR switch of the PASID from X to Z would occur. Since a PASID MSR is only controlled/managed by the operating system (OS), such operation becomes difficult.

Instead with embodiments, more ready access to different address spaces with different PASIDs may occur without switching a PASID stored in a PASID MSR. To this end, a PASID handle may be used to address these limitations and enable the use cases stated above.

Embodiments further may be used for software compartmentalization (e.g., serverless web-assembly, lightweight virtualization), where a process may have multiple address spaces (and potentially different page tables for each compartment) that are mapping different set/amount of memory. Embodiments may provide an additional level of indirection (e.g., Thread-ASID, PASID Handle, IO-ASID) to identify sub-process address spaces.

In addition, techniques are provided to provide QoS and/or rate control for managing requests of different address spaces, e.g., using PASID information to enforce sharing of resources. In this way, different address spaces having different priorities may share resources, in one or both of a source and destination.

Figure 2:
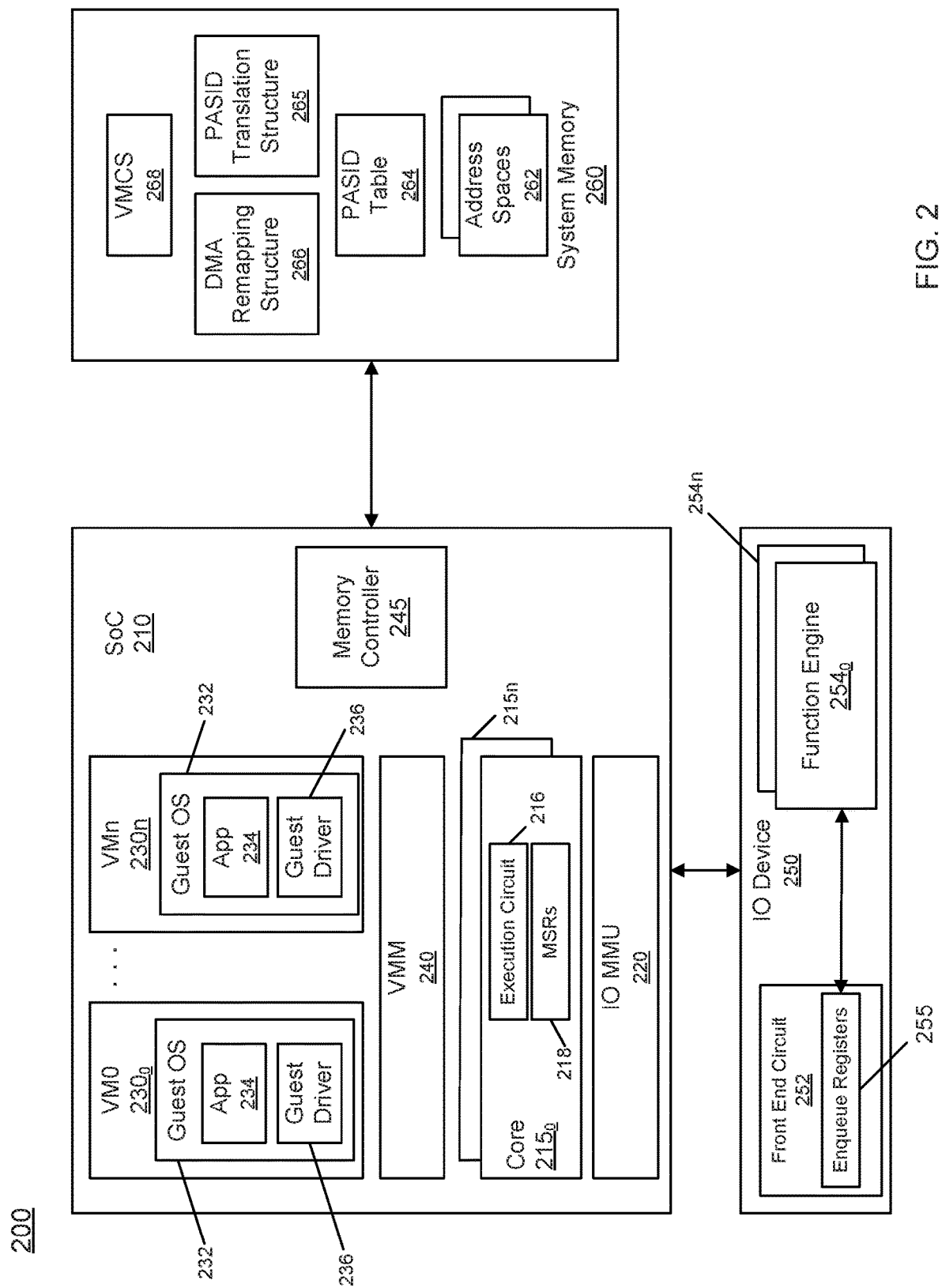
FIG. 2 is a block diagram of a system in accordance with an embodiment.

Referring now to FIG. 2, shown is a block diagram of a system in accordance with an embodiment. As shown in FIG. 2, system 200 may be any type of computing system, ranging from small portable devices to client-based systems or server-based systems. In the high level shown, a system on chip (SoC) 210 or other such processor couples to a system memory 260 and an I/O device 250. While shown with only these few components for ease of discussion, understand that a given computing system may include many more components. Further, while a single I/O device 250 is shown, understand that in embodiments there may be multiple I/O devices coupled to SoC 210. In addition, many systems, particularly server-based systems, may include multiple SoC's and system memory.

First with reference to SoC 210, shown are a plurality of cores $215_0$-$215_n$. In different embodiments, cores 215 may be homogeneous or heterogeneous cores, e.g., having different capabilities with regard to power consumption, instruction set capabilities and so forth. In the high level shown in FIG. 2, each core 215 may include at least one execution circuit 216, which may receive and execute instructions. In addition, each core 215 may include a plurality of MSRs 218. In embodiments herein, one or more MSRs, which may be implemented as configuration registers, may be configured to store PASID and/or QoS information for use in execution and handling of particular instructions of an instruction set architecture as described herein. To enable communication of requests from I/O device 250 to memory controller 245, an I/O memory management unit (IOMMU) 220 may be provided. In embodiments herein, IOMMU 220 may be configured to translate an incoming virtual address using DMA remapping structures, e.g., of a virtual address to a corresponding physical address.

In the embodiment of FIG. 2, SoC 210 is shown to include support for virtualization. Specifically, SoC 210 may be virtualized under control of a virtual machine monitor (VMM) 240 or other virtualization orchestration layer such as a hypervisor or so forth. As is known, VMM 240 may instantiate one or more virtual environments. In the embodiment shown in FIG. 2, VMM 240 may instantiate a plurality of virtual environments or guests $230_0$-$230_n$. Each virtualization environment 230 may be implemented as a virtual machine that includes a guest OS 232 on which one or more applications 234 may execute. In addition, a guest driver 236 may be provided.

In embodiments herein, virtualization environments 230 may issue requests including I/O write requests to one or more address spaces. With embodiments herein PASID information may be used in connection with these I/O write requests, such that a request (e.g., from a given application 234) of a first address space may write information to another address space. And with multiple such write requests, this first address space may issue write requests to multiple address spaces.

To enable interaction with system memory 260, a memory controller 245 is provided. In the high level view shown in FIG. 2, various components of system memory 260 relevant herein are shown. As seen, system memory 260 may include a plurality of address spaces 262. Each address space 262 may be associated with a given process or sub-process such as a thread, I/O device or so forth. As will be described herein, to enable a request associated with one address space to access another address space, information in a PASID table 264 may be used. Still further, to provide address translations, e.g., between virtual addresses, physical addresses, guest virtual addresses and host physical addresses, one or more PASID translation structures 265 and one or more DMA remapping structures 266 also may be present. In addition, each virtualization environment 230 may be associated with a corresponding virtual machine control structure (VMCS) 268, also present in system memory 260.

Still referring to FIG. 2, I/O device 250 includes a front end circuit 252 that is configured to receive incoming requests from SoC 210. Such requests may include write requests, e.g., implemented as enqueue command instructions as described herein. In response to such requests, front end circuit 252 may access one of multiple enqueue registers 255. According to a write request, command data received may be written to a given one of enqueue registers 255 according to a destination operand of an enqueue command instruction. in turn, these requests may be sent to one of a plurality of function engines $254_{0-n}$ within I/O device 250. Understand while shown at this high level in the embodiment of FIG. 2, many variations and alternatives are possible.

In an embodiment, multiple flavors of user-level ENQCMD instructions may be provided to allow non-privileged software to write commands to enqueue registers located in devices coupled to a processor such as peripheral component interconnect express (PCIe) devices, single root I/O virtualization (SR-IOV) devices, scalable I/O virtualization devices. These enqueue device registers may be accessed using memory-mapped I/O (MMIO). The ENQCMD instruction begins by reading 64 bytes of command data from its source memory operand. The instruction then formats those 64 bytes into command data with a format consistent with Table 1.

Referring now to Table 1, shown is an example arrangement of information stored in an enqueue register in accordance with an embodiment. As shown in Table 1, an enqueue register may be 512-bits and may include command, privilege, QoS, reserved and PASID fields to store information shown in Table 1.

TABLE 1

| Device Specific Command | PRIV | QC | QP | Rsvd | PASID |
| --- | --- | --- | --- | --- | --- |

As shown in Table 1, the stored information includes:
a PASID;
a reserved field;
QoS information (namely a QoS class (QC) value and a QoS priority (QP) value);
a privilege level;
device specific command data obtained from a memory read.

In an embodiment, the QC value provides a way to perform coarse-grained QoS management, where a set of resources can be reserved for each QoS class. Note that class may be used to denote resource allocations in the device such as amount of device side caches allocated for this class of service, number of queue entries in the device, percentage of compute cycles reserved for this class of service, amount of device side memory bandwidth allocated to this class of service, etc.

In one implementation, where each class has a predefined resource allocation and any unreserved resources are shared by all classes, the QP value may further extend the QoS classification by providing a way to specify priority within a particular QoS class, allowing more fine-grain QoS management. For example, if a device supports two QoS classes, the QoS priority information may help in selection/prioritization of one request (e.g., with PASID A) from the other request (e.g., with PASID B), where both were categorized being in the same class (thus helping in selection of which request to process/execute first from a given queue).

To enable access to multiple address space more efficiently, embodiments provide additional hardware structures and instructions. To this end, in one embodiment a given MSR may store an address of a PASID table. In one embodiment, this address is a physical address, and in other embodiments this address is a virtual address. This PASID table that is referenced by this MSR stores PASID values (and possibly QoS information) associated with different handles. In turn, a handle may be obtained from command data obtained in response to an enqueue command instruction.

In general, in response to a given enqueue command instruction (e.g., ENQCMDX r32/64, m512 or ENQCMD r32/64, m512), the following operations may proceed:
Read 64 bytes of command data from a source memory operand
Extract a PASID_TABLE_HANDLE (PTH) from the command data,
Acquire a PASID table address from a PASIDX MSR,
Index the PASID table using PTH extracted from the command data, and acquire the
PASID value and potentially QoS information, and
Populate this acquired PASID value and QoS information in the command data.

In certain situations, a fault may result from execution of such instruction. For example, an instruction may return a general-protection exception when a "V" (Valid) bit is 0x0 in an MSR, or a "V" (Valid) bit in the PASID table entry selected based on PTH is 0x0. In an embodiment where the address stored in the MSR is a virtual address, there could be an additional fault condition associated with the PASID table or the page-tables pointing to the PASID table not being present in the physical first memory, resulting into a #PF (page-fault) exception.

In some embodiments, a hierarchical structure (e.g., PASID directory to PASID table) is referenced by the MSR, and this multi-level structure is indexed/looked-up with the use of PTH to acquire PASID and possibly QoS information.

This QoS information may be configured for each PASID through a given CPU structure (e.g., through a PASID translation structure or PASID MSR or PQR ASSOC MSR or PASID table pointed by the PASID MSR). This configured QoS information associated with a given PASID may be obtained, e.g., by CPU micro-code, and embedded as part of the enqueue store command data. In turn, this command data including QoS information may be communicated via internal and external interconnect fabrics to carry the QoS information associated with the enqueue store.

When this QoS information is received in a destination such as a scalable device, it may be used to handle an incoming request. Such handling may include: (i) to allow configuration of a quota for each QoS class; (ii) to track quota usage for each QoS class by examining/processing QoS class received as part of the enqueue store; (iii) to enforce quota for each QoS class by returning a re-try response for enqueue store when the quota limit is exceeded; and (iv) to enforce QoS priority within a particular QoS class during the selection of the request to be processed.

In one embodiment system software configures QoS information associated with a PASID in CPU structures (e.g., PASID translation structure, PASID MSR, PQR ASSOC MSR or PASID table pointed by the PASID MSR), and in scalable device managed structures (e.g. device registers or memory pointed by these registers). On invocation of an enqueue command instruction, QoS information associated with the PASID is acquired from the relevant structure and populated into one or more enqueue store command data fields. Once the QoS information is populated in the command data, it is carried over an interconnect fabric to a scalable device, and more particularly to a front end circuit. This front end circuit processes the request if the configured QoS criteria is met, otherwise a retry response is returned.

In one embodiment, a PASID MSR may be configured with QoS management fields. System software may configure QoS settings in these fields for each thread of the process (e.g., application or container) during the PASID configuration. On the execution of an enqueue command instruction, CPU micro-code acquires these QoS settings and populates them in the enqueue store command data. System software can choose to dynamically update these settings as desired.

Figure 3A:
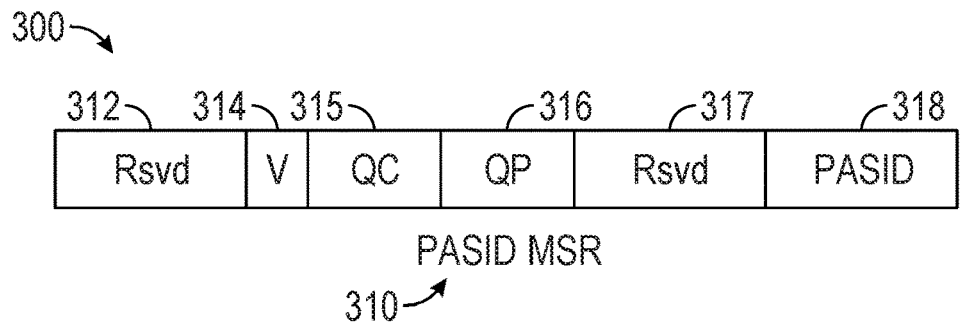
FIG. 3A is a block diagram of a portion of a processor in accordance with an embodiment.

Referring now to FIG. 3A, shown is a block diagram of a portion of a processor in accordance with an embodiment. As shown in FIG. 3A, a processor 300 may include a hardware structure to enable execution of a user-level instruction of an ISA to perform enqueue register writes that leverage QoS settings. As illustrated in FIG. 3A, processor 300 includes a first MSR 310, referred to herein as a PASID MSR. As shown, first MSR 310 includes a plurality of fields, each to store various information. As shown, a QoS class (QC) value may be stored in a QC field 315 and a QoS priority (QP) value may be stored in a QP field 316. In addition, a valid indicator may be stored in a valid field 314. As further shown, first MSR 310 may also include a PASID field 318 to store a PASID value and reserved fields 312, 317.

In other cases, QoS information may be obtained from other MSR's. For example with reference to FIG. 3B, QC and QP information may be included in a PQR association MSR 330, which may provide resource monitoring information for use in cache monitoring, included in a processor 320. As shown, MSR 320 includes a plurality of fields, each to store various information. As shown, a QC value may be stored in a QC field 325 and a QP value may be stored in a QP field 326. In addition, a resource monitor ID (RMID) may be stored in a RMID field 328. As further shown, MSR 320 may also include reserved fields 322, 327. In this arrangement, these QoS values are associated with a thread/PASID. As described earlier, on invocation of an enqueue command instruction, corresponding QoS settings are acquired from this MSR and populated in the enqueue store command data.

In another embodiment, a PASID value and QoS information may be obtained from a PASID table. On invocation of an enqueue command instruction, corresponding QoS settings may be acquired from the PASID table and populated in the enqueue store command data with the PASID value.

Figure 3B:
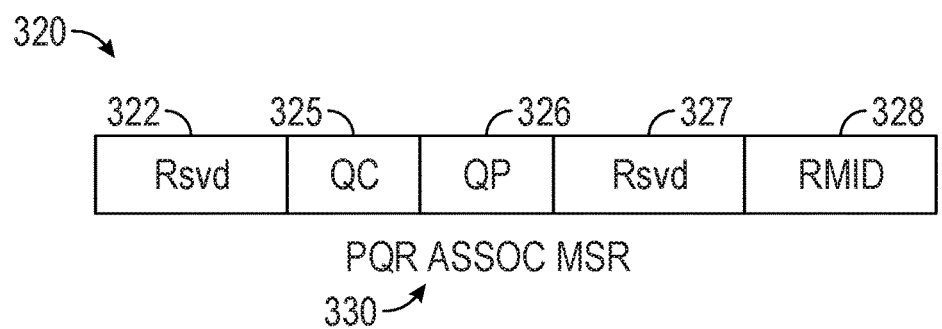
FIG. 3B is a block diagram of a portion of a processor in accordance with another embodiment.
Figure 3C:
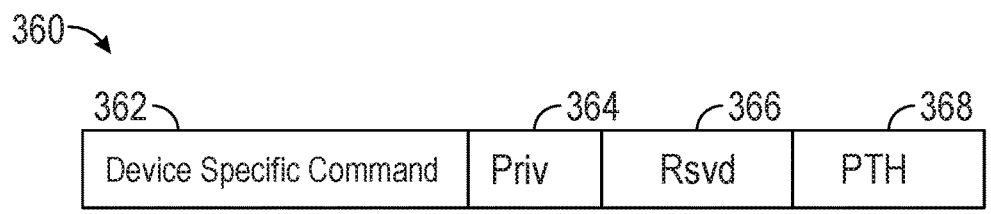
FIG. 3C is a block diagram of a portion of a processor in accordance with another embodiment.
Figure 3C:
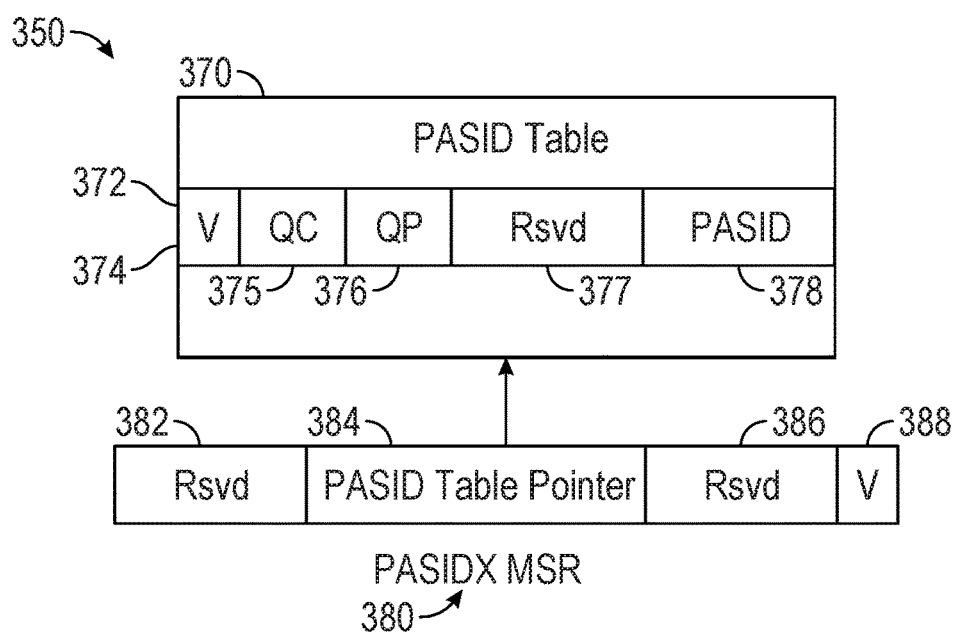

Referring now to FIG. 3C, shown is a block diagram of a portion of a processor in accordance with another embodiment. In this embodiment, a MSR 380, e.g., a PASIDX MSR, may include a PASID table pointer stored in a PASID table pointer field 384, which may be used to identify an address, e.g., in a system memory of a PASID table 370. Note that in various embodiments, at least a portion of a PASID table may be stored within a processor, e.g., in a cache memory. The PASID table pointer may point to a base address of PASID table 370. As illustrated, PASID table 370 may include a plurality of entries 372, each of which is to store various information. In the embodiment shown, each entry 372 includes a valid field 374 to store a valid indicator and a PASID field 378 to store a PASID value. As further shown, each entry 372 also includes fields to store QoS information. Specifically as shown, a QC field 375 may be used to store a QC value, and a QP field 376 may be used to store a QP value. In addition, each entry 372 may include a reserved field 377.

To index into PASID table 370, a PASID table handle may be used to identify a given entry. Thus as further illustrated in FIG. 3C, a command data 360, e.g., obtained from a system memory location identified by the source operand of the user-level instruction, may include this PASID table handle in a PASID table handle field 368. As further illustrated, command data 360 also may include device specific command information stored in a command field 362, a privilege indicator stored in a privilege field 364, and a reserved field 366. Although not shown in command data 360 obtained from system memory, understand that a processor may insert the QC and QP values in command data 360 before it is sent to a destination.

Thus in the embodiment shown in FIG. 3C, in response to a user-level instruction, a PASID table pointer may be obtained from MSR 380 to access PASID table 370 and in turn a given entry may be accessed via indexing using a PASID table handle received within command data 360. Other implementations of course are possible. Understand while FIGS. 3A-3C show particular hardware structures for use in execution of various enqueue command instructions leveraging QoS information, many more hardware components may be involved in such instruction execution.

Figure 4:
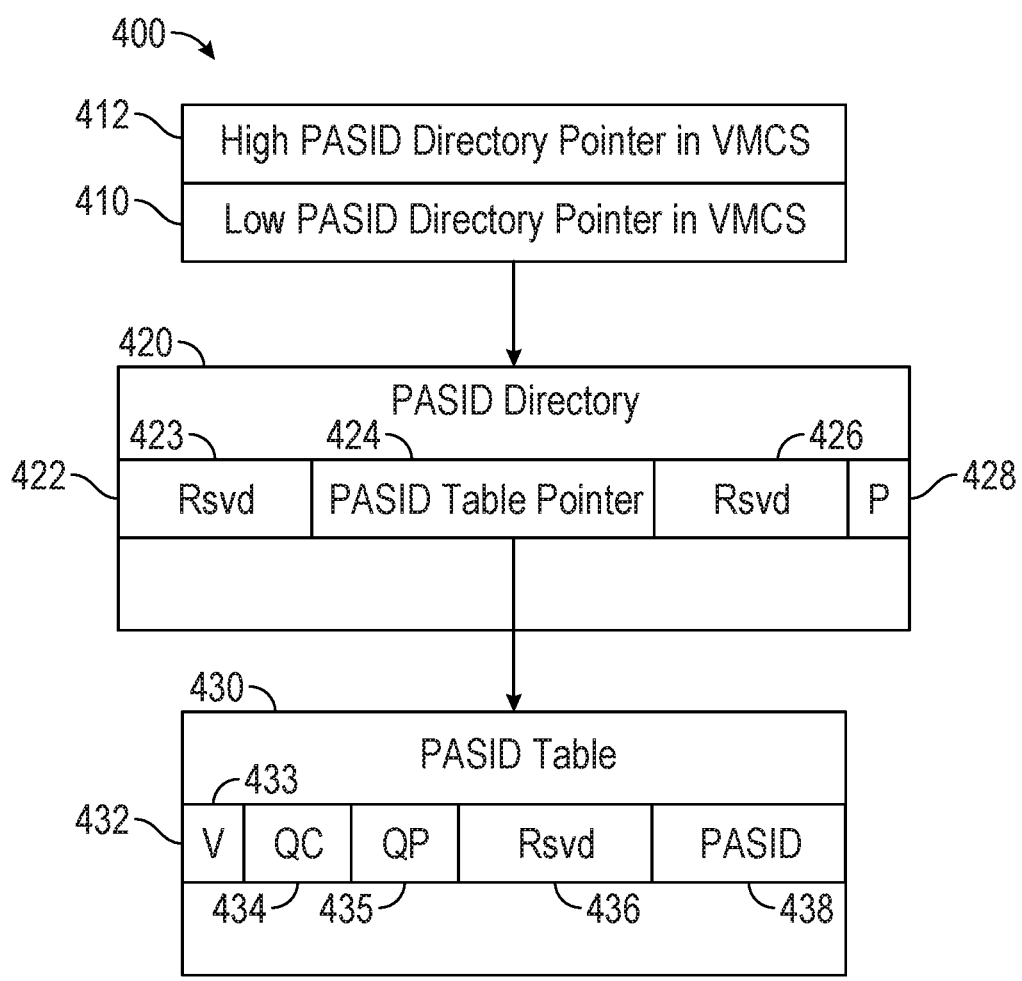
FIG. 4 is a block diagram of a portion of a processor in accordance with another embodiment.

In yet another embodiment, a processor configured for use in a virtualization environment may also leverage QoS information as described herein. In a virtualized environment, a PASID translation structure may be used to configure QoS settings for different PASIDs. On each PASID translation, CPU micro-code acquires these QoS settings from the PASID table and populates/replaces it in the enqueue store command data. Referring now to FIG. 4, shown is a block diagram of a portion of a processor in accordance with another embodiment. As shown in FIG. 4, a processor 400 may include PASID translation structures that provide for inclusion of QoS information. As illustrated in FIG. 4, processor 400 includes multiple pointers 410, 412 each of which is adapted to point to a given PASID directory within a VMCS.

In the embodiment shown in FIG. 4, PASID directory pointer 410 is used to access a PASID directory 420 that includes a plurality of entries 422. As shown, each entry may include a PASID table pointer stored in a PASID table pointer field 424, reserved fields 423, 426, and a P field 428 to indicate presence (e.g., validity). With this PASID table pointer, access may be made to a PASID table 430. As illustrated, PASID table 430 includes a plurality of entries 432. As illustrated, each entry 432 may store a valid indicator in a valid field 433, a QC value in a QC field 434, a QP value in a QP field 435 and a PASID value in a PASID field 438. As further shown, each entry 432 may include a reserved field 436.

In some embodiments, CPU micro-code acquires guest QoS settings from the enqueue store command data, converts it into host QoS settings based on the translation information configured, and then re-populates these host QoS settings in the final enqueue store command data in place of the guest QoS settings, before the command data is sent out in the fabric. For example, PASID table entries in a PASID table of the PASID translation structure may store a compressed table that is indexed by guest QoS value to determine the host QoS settings. Another approach may be to provide a QoS translation table pointer stored in the PASID table entry. With this pointer, CPU microcode may walk this table to acquire host QoS settings associated with the guest QoS settings.

Figure 5:
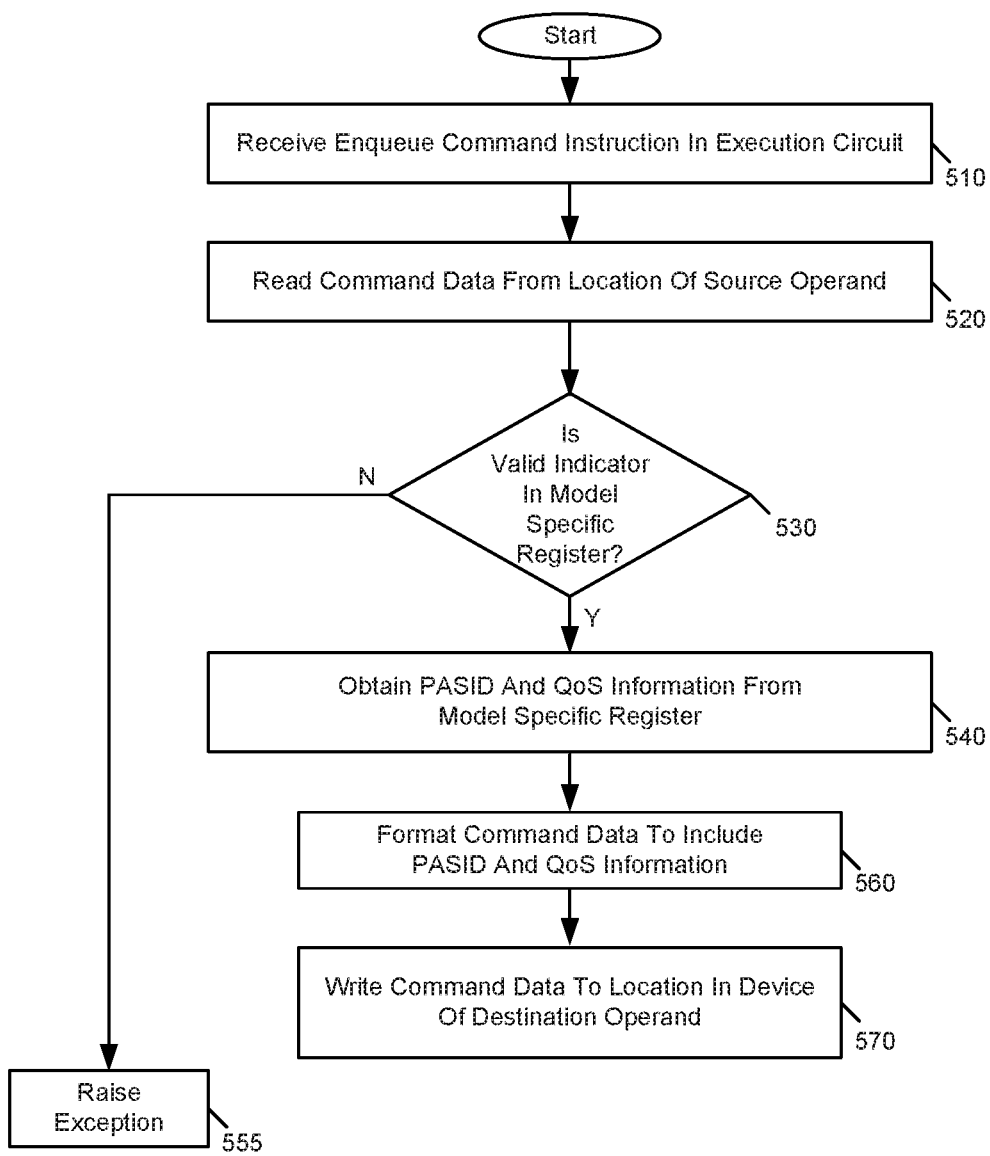
FIG. 5 is a flow diagram of a method in accordance with one embodiment.

Referring now to FIG. 5, shown is a flow diagram of a method in accordance with one embodiment. As shown in FIG. 5, method 500 is a method for executing an enqueue command instruction to leverage QoS information. Method 500 may be performed by an execution circuit of a processor, after fetch by an instruction fetch circuit and decode in an instruction decode circuit. As such, method 500 may be performed by hardware circuitry, firmware, microcode, a combination thereof or the like. As illustrated, method 500 begins by receiving an enqueue command instruction in the execution circuit (block 510). Assume that this enqueue command instruction is: ENQCMD r32/64, m512 or ENQCMDX r32/64, m512. Here, m512 is to identify a source operand and r32/64 identifies a destination operand, which may be present in a device, e.g., an enqueue register (and the "X" identifies access to a PASIDX MSR). Next in response to this instruction the execution circuit may read command data, which it obtains from a location identified by a source operand of the instruction (block 520). Although embodiments are not limited in this regard, in one example this location may be present in an address space of an issuer of the instruction, e.g., an address space of a process that issued the instruction.

Still with reference to FIG. 5 next at diamond 530 it is determined whether a valid indicator in the MSR(s) is set. If not, no further analysis occurs, and instead an exception such as a general protection exception may be raised (block 555).

Otherwise when the valid indicator is set, at block 540 a PASID value and QoS information may be obtained from one or more MSRs, such as discussed above. Understand that this QoS information may include QC and QP values, as examples.

Next at block 560 the execution circuit may format the command data to include this PASID value and the QoS information (block 560). For example, the execution circuit may insert this PASID value into the least significant bits of the command data (thus overriding the PASID table handle when present, as it is no longer needed). In addition the QoS information may be included in the command data.

Finally, at block 570 this command data may be written to a location in a device such as an I/O device. More specifically, in response to the instruction the execution circuit may cause this command data to be written into a particular location in the I/O device identified by a destination operand of the instruction. In particular embodiments herein this location may be a given enqueue register of the device. Understand that to effect this write, the execution circuit may send the command data through a processor hierarchy, including an MMU. Understand while shown at this high level in the embodiment of FIG. 5, many variations and alternatives are possible.

Figure 6:
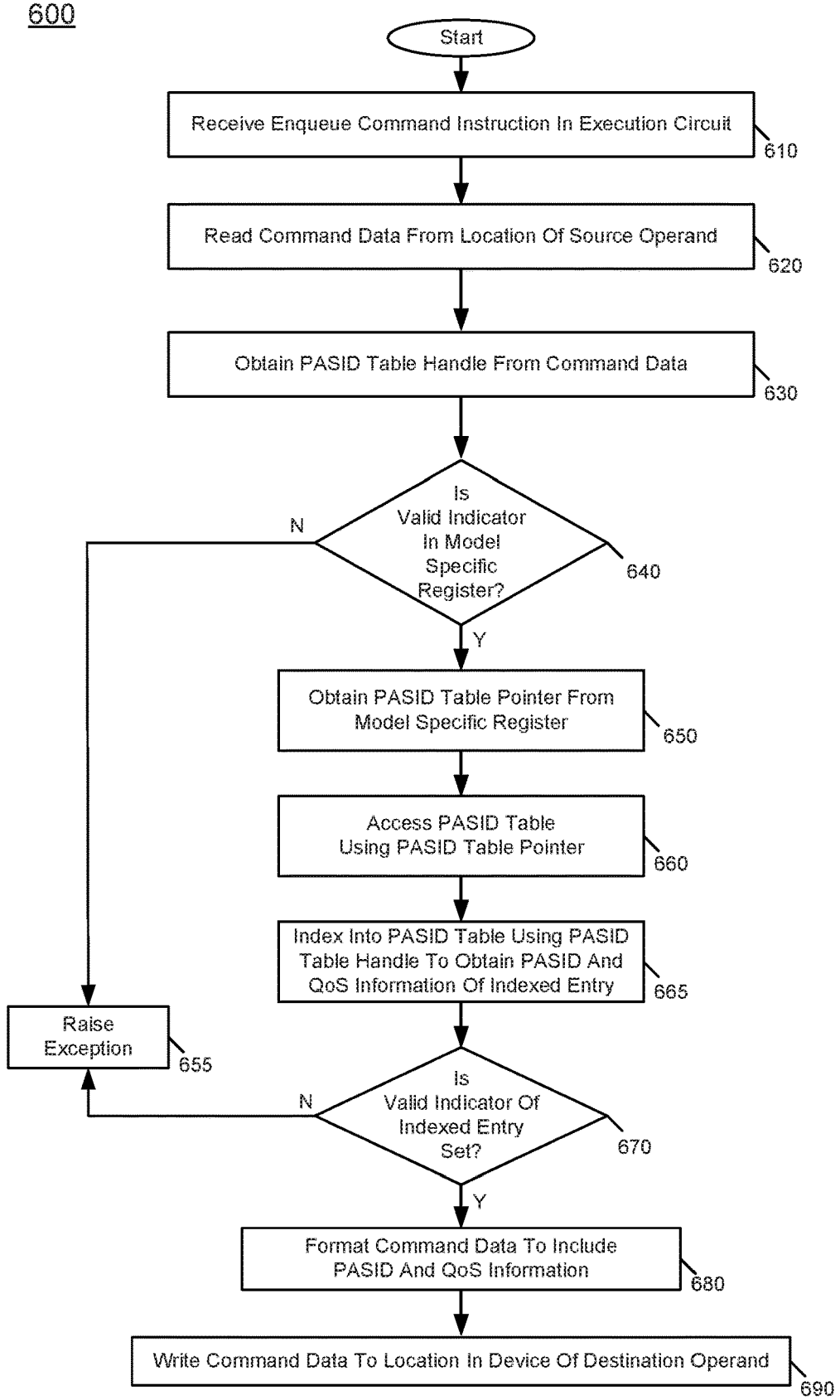
FIG. 6 is a flow diagram of a method in accordance with another embodiment.

Referring now to FIG. 6, shown is a flow diagram of a method in accordance with another embodiment. As shown in FIG. 6, method 600 is a method for executing an enqueue command instruction that leverages QoS information present in a PASID table. Method 600 may be performed by an execution circuit of a processor, after fetch by an instruction fetch circuit and decode in an instruction decode circuit. As illustrated, method 600 begins by receiving an enqueue command instruction in the execution circuit (block 610). Next in response to this instruction the execution circuit may read command data, which it obtains from a location identified by a source operand of the instruction (block 620).

Still with reference to FIG. 6 next at block 630 a PASID table handle may be obtained from the command data. Then it may be determined at diamond 640 whether a valid indicator of a MSR (storing a PASID table pointer) is set. If not, no further analysis occurs, and instead an exception such as a general protection exception may be raised (block 655). Otherwise when it is determined that the valid indicator is set, a PASID table pointer may be obtained from a MSR (block 650). Then at block 660 the PASID table may be accessed using the PASID table pointer, which may be used to identify a base address of this table. In turn, at block 665 the PASID table handle may be used to index into the PASID table to identify an indexed entry from which a PASID value and QoS information may be obtained. Next at diamond 670 it is determined whether a valid indicator in this entry is set. If not, no further analysis occurs and an exception is raised (block 655).

Otherwise when it is determined that the valid indicator is set, the execution circuit may format the command data to include the PASID value and the QoS information (e.g., in terms of QC and QP values) (block 680). For example, the execution circuit may insert this PASID value into the least significant bits of the command data (thus overriding the PASID table handle, as it is no longer needed), and further insert the QC and QP values. Finally, at block 690 this command data may be written to a location in a device such as an I/O device. Understand while shown at this high level in the embodiment of FIG. 6, many variations and alternatives are possible.

Note that the QoS information associated with a given process may be used by a downstream device such as an I/O device for use in handling incoming requests associated with a process. Such information may be used to perform coarse-grained and fine-grained handling of requests, first on a class basis and then on a priority basis within a class.

Figure 7:
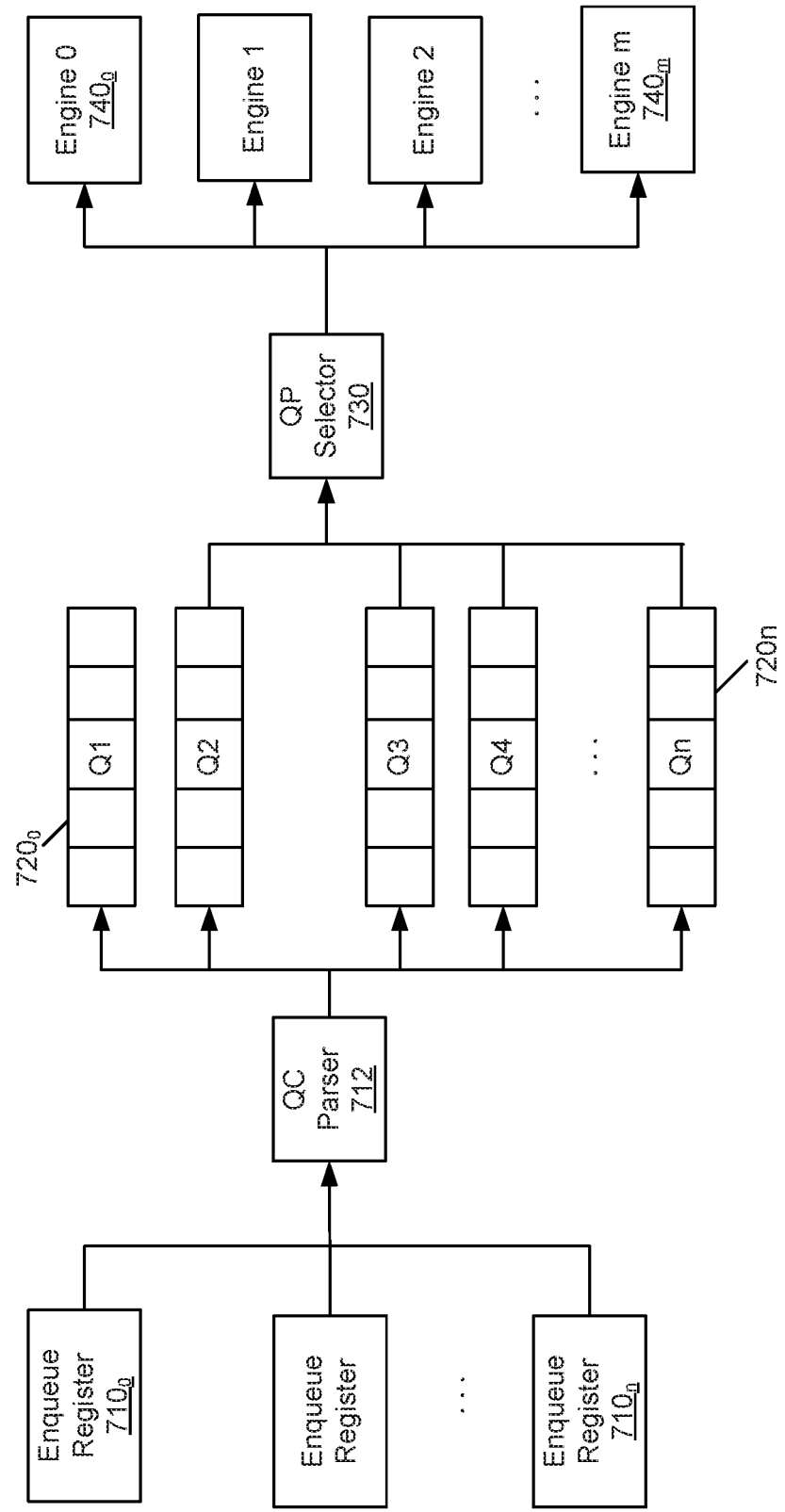
FIG. 7 is a block diagram of a portion of a scalable device in accordance with an embodiment.

Referring now to FIG. 7, shown is a block diagram of a portion of a scalable device in accordance with an embodiment. More specifically, FIG. 7 illustrates front end circuitry 700 of a scalable device including associated enqueue registers. As illustrated, incoming requests, e.g., enqueue write requests, may be received in one of a plurality of enqueue registers $710_{0-n}$. In embodiments herein, front end circuitry may receive and parse incoming requests, including accessing QoS information and command data. To this end, input circuit 710 may include a QC parser 712 configured to access a QC value from the command data to identify a given QoS class. Parser 712 further may include quota hardware to determine whether a quota for the given class has been reached. If so, it may drop the request and issue a retry signal back to the requester (e.g., processor). Otherwise, if there are available resources (e.g., room within a given queue), input circuit 710 may direct the request including its command data to a corresponding one of multiple queues $720_0$-$720_n$. Note that queues 720 may be virtual queues that act as arrival/holding stations to hold enqueue command data as they enter the front-end of the device and parsed by QC parser 712. In some embodiments, these virtual queues may be built as one physical queue where each entry is tagged with a corresponding class (QC).

In turn, a QP selector 730 may then access the given queues to identify, based at least in part on QoS priority information (namely QP values), a given request to be scheduled to one of multiple function engines $740_0$-$740_m$. In this way, a more coarse-grained QoS mechanism may be implemented at the front end to identify a given QoS class and provide an incoming request to one of multiple queues 720. In turn, QoS priority information may be used to perform finer-grain QoS control to select an appropriate request for delivery to a given function engine 740. Understand while shown at this high level in the embodiment of FIG. 7, many variations and alternatives are possible.

Figure 8:
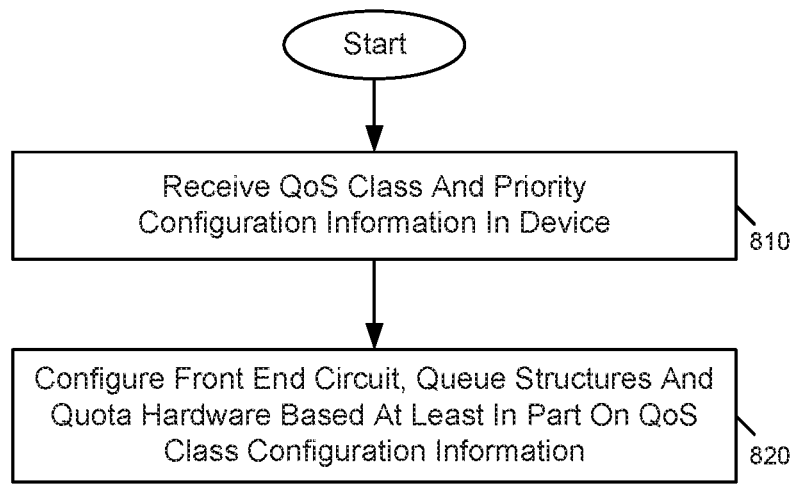
FIG. 8 is a flow diagram of a method in accordance with yet another embodiment.

Referring now to FIG. 8, shown is a flow diagram of a method in accordance with yet another embodiment. As shown in FIG. 8, method 800 is a method for configuring hardware within a scalable device to perform QoS handling of incoming requests as described herein. As such, method 800 may be performed by an execution circuit of a processor, and/or other hardware circuitry, firmware, microcode, a combination thereof or the like. As illustrated, method 800 begins by receiving QoS configuration information within the device (block 810). In an embodiment, this QoS configuration information may include class information to identify a number of classes and quota information for resources to be allocated to such classes. In addition, the QoS configuration information further may include priority information to identify a number of priority levels, e.g., on a per class basis.

Next at block 820 various circuitry of the device, including front end circuitry, queue structures, and quota hardware may be configured based at least in part on this QoS class configuration information. For example, each of multiple queues can be associated with a given QoS class. Understand that differently sized queues may be associated with the different classes. In addition, quota hardware can be configured, e.g., based on a count of available resources within these queue structures. Note that a variety of QoS configuration information may be provided. As examples, the QoS configuration information may include, on a per class basis: number of minimum and maximum queue slots reserved (i.e., size of virtual queue associated with each class); number of minimum and maximum memory/channel bandwidth reserved; amount of device memory reserved; number of device engines and other processing resources/power reserved; number of CPU or microprocessor/controller cycles reserved; number of interrupt entries/slots reserved; and type of operators/operations supported (e.g., allow op1/op2/op3 for class0, but only allow op1 for class1). Understand while shown at this high level in the embodiment of FIG. 8, many variations and alternatives are possible.

Figure 9:
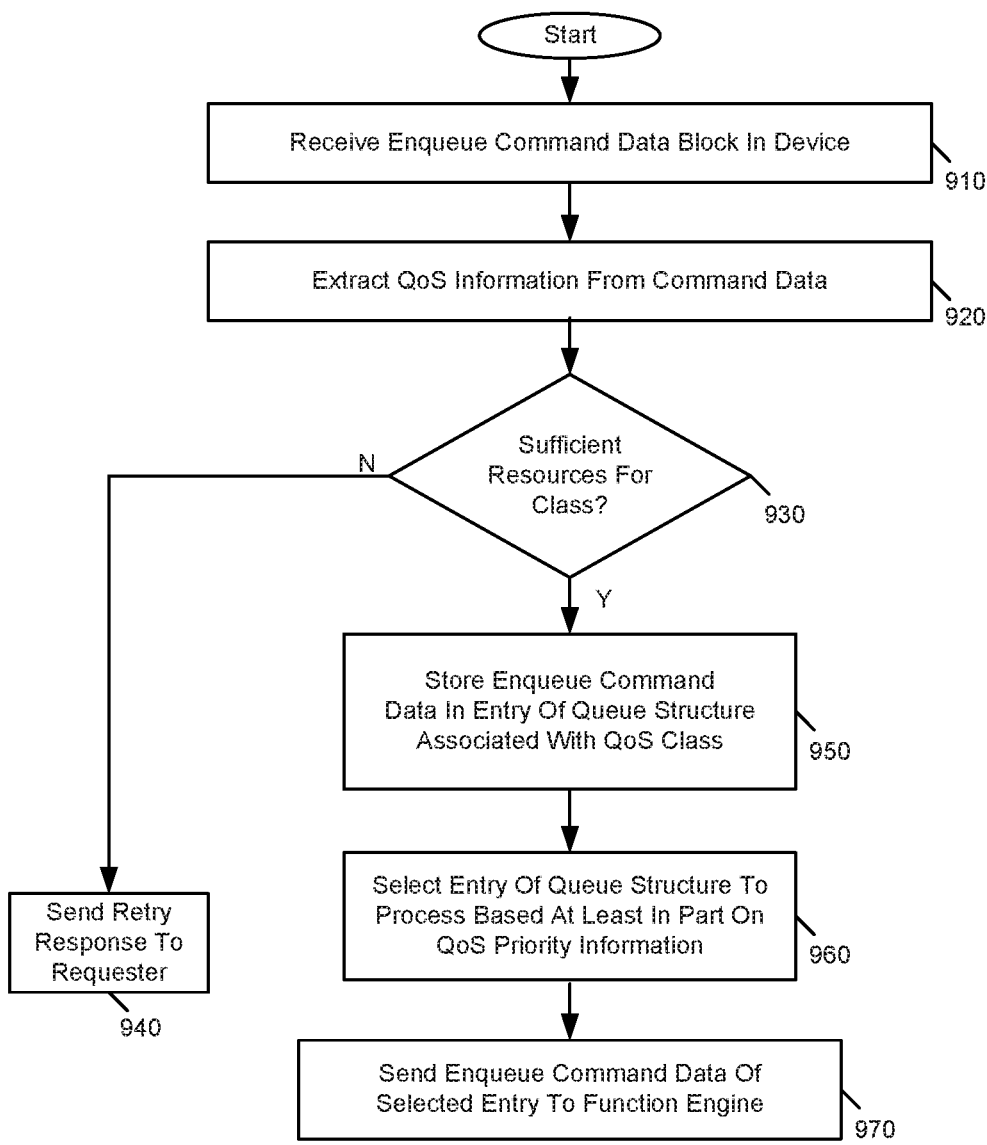
FIG. 9 is a flow diagram of a method in accordance with yet another embodiment.

Referring now to FIG. 9, shown is a flow diagram of a method in accordance with yet another embodiment. As shown in FIG. 9, method 900 is a method for handling incoming enqueue command instructions within a device using QoS information as described herein. As such, method 900 may be performed by a front end circuit of a device, and/or other hardware circuitry, firmware, software, a combination thereof or the like. As illustrated, method 900 begins by receiving an enqueue command data block in the device (block 910). Then QoS information may be extracted from this command data (block 920). For example, a front end circuit may include a parser to extract this information. Next, it may be determined at diamond 930 whether there are sufficient resources available for a given QoS class of the request. If not, the request may be dropped and a retry response is sent back to the requester (block 940).

Still with reference to FIG. 9, instead if it is determined that there are sufficient resources for the class, control passes to block 950. At block 950 the command data may be stored in an entry of a queue structure associated with the QoS class.

Given that there may be a large number of entries within this queue structure, to enable fine-grain QoS handling to occur, next at block 960 an entry of the queue structure may be selected to be processed based at least in part on the QoS priority information. For example, a higher priority request, according to a QP value, may be selected over a lower priority request. Then at block 970 the command data may be sent to a processing engine, e.g., a given function circuit of the scalable device. Understand while shown at this high level in the embodiment of FIG. 9, many variations and alternatives are possible.

In other cases, such as where a device does not have support for QoS handling, rate control can be performed on a sender side, e.g., within a processor to effectively block requests from a given process that has exceeded its fair share of requests, e.g., within a given time window.

In some implementations, a processor may implement rate control, e.g., on a per-PASID basis to realize rate control of work submissions. In an embodiment, a PASID table entry of a PASID translation structure may be used to capture rate control parameters associated with a particular PASID, and also parameters for enabling/disabling rate control associated with this PASID. On each successful PASID translation, these rate control parameters are looked-up and updated (when enabled). In the event that the rate associated with a particular PASID exceeds a programmed threshold, the processor may cause a VMExit to take an appropriate action. An appropriate action could be allowing the enqueue operation to proceed, deactivating/terminating the PASID, scheduling another VM/container/VP on this processor core, or throttling the PASID by mimicking failed ENQCMD/ENQCMDS submission through a ZF (zero-flag).

Figure 10:
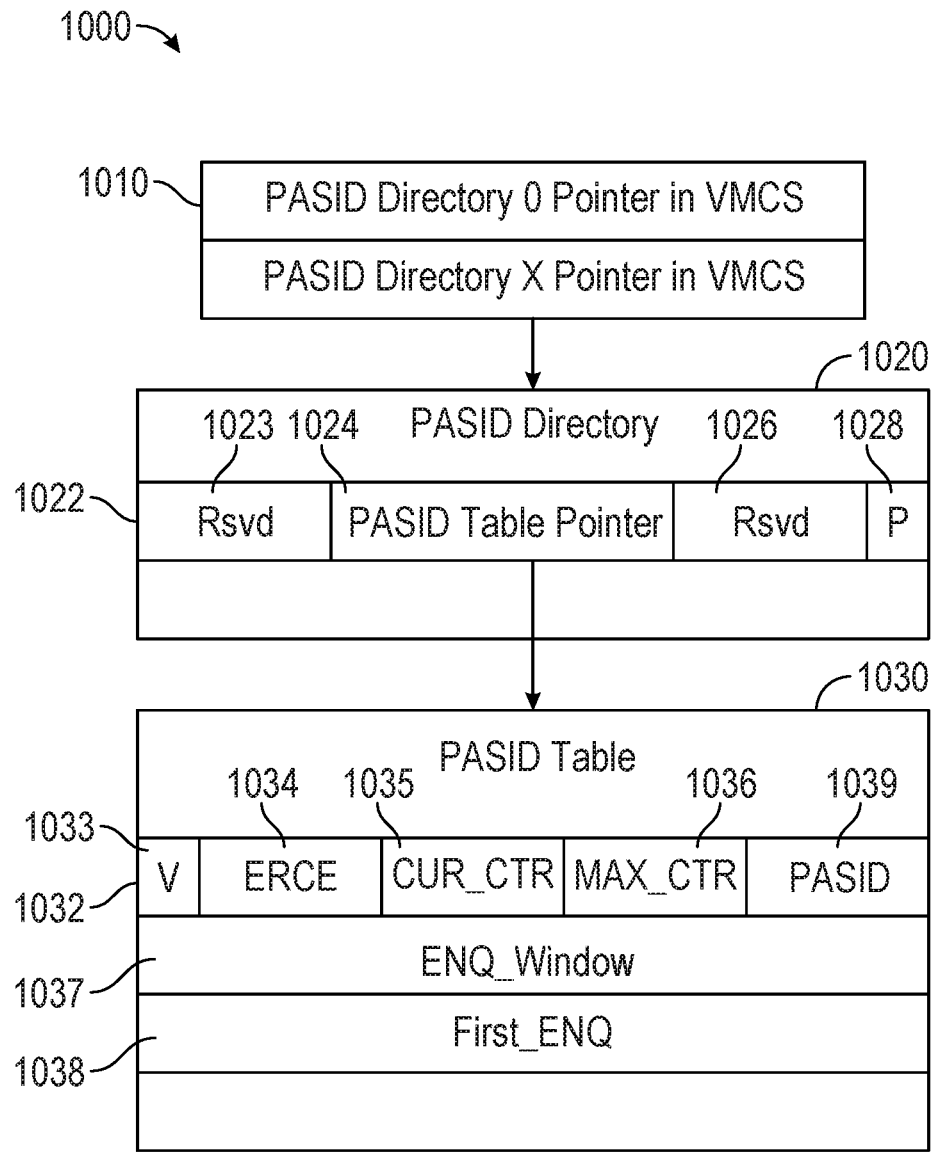
FIG. 10 is a block diagram of a portion of a processor in accordance with another embodiment.

In a particular embodiment, a VMCS may include an execution control field, ENQ_RATE_CONTROL, to indicate whether ENQ rate control is enabled or not. If so, various fields may be provided in a PASID table entry of a PASID translation structure. Referring now to FIG. 10, shown is a block diagram of a portion of a processor in accordance with another embodiment. As shown in FIG. 10, processor 1000 includes a VMCS 1010 that may include various pointers to different PASID directories. Based on a given pointer, a PASID directory 1020 may be accessed. As shown, PASID directory 1020 includes a plurality of entries 1022, each of which includes multiple fields. As shown in FIG. 10, each entry 1022 may include a PASID table pointer field 1024 to store a PASID table pointer. In addition, reserved fields 1023, 1026 may be provided, along with a P field 1028. Using the PASID table pointer, a given entry within a PASID table 1030 may be accessed. As shown, an entry 1032 may include a plurality of fields, to store in part, information for performing rate control for associated PASID. As illustrated, entry 1032 includes a valid field 1032 to store a valid indicator, and an enqueue rate control enable (ERCE) field 1034 to store a flag that indicates whether ENQ rate control is enabled for given PASID or not; an ENQ WINDOW field 1037 to store a value that indicates duration (in number of cycles) over which a maximum number of ENQCMD/S are enforced; a MAX_CTR field 1036 to store a number that indicates maximum number of ENQCMD/S executions allowed in an ENQ_WINDOW duration; a CUR_CTR field 1035 that stores a number of ENQCMD/S left in the quota for a given window; and a FIRST_ENQ field 1038 that stores a timestamp of the first ENQCMD/S in a particular ENQ window. Of course understand that additional different fields may be present in other embodiments. Note that when a given process exceeds its rate, VMExit may be triggered with a reason (ENQ_RATE_CONTROL) to indicate that the rate is exceeded.

In some embodiments, the ENQ_WINDOW field is kept in the VMCS, and in other embodiments ENQ_WINDOW field may be replaced with a constant number in the algorithm described below. The overall flow for this rate control may include system software configuring the fields mentioned above with the appropriate values and enabling enqueue rate control. For each execution of an ENQCMD/S instruction, microcode may determine whether that execution is in a current window or a new window by examining ENQ rate control fields associated with the PASID in the PASID translation structure. If the instruction is executed in the same window, a counter is decremented to mark appropriate depletion of a quota in a given window. When this quota is fully depleted (e.g., the counter reaches zero), a VM exit occurs with exit reason ENQ rate control. If microcode determines the execution of instruction is in a new window, it repopulates the quota by resetting the counter to its original value.

Referring now to Table 2, shown is a pseudo code implementation of one embodiment of processor-based rate control.

TABLE 2

```
IF ERCE is enabled for given PASID && ENQ_RATE_CONTROL is
enabled
    NOW = Current_Cycle_Counter
    IF NOW − FIRST_ENQ > ENQ_WINDOW
        FIRST_ENQ = NOW   // We are in a new window
    CUR_CTR = MAX_CTR
    FI
    IF CUR_CTR is 0x0
        VM_Exit (Reason = ENQ_RATE_CONTROL)
    FI
    Decrement CUR_CTR by one
FI
```

In another embodiment, the rate control parameters may be stored in a PASID table entry to provide rate control parameters associated with this software thread. In operation, on each ENQCMD or ENQCMDX submission, these rate control parameters are looked-up and updated (when enabled). In the event that the rate associated with this software thread exceeds a programmed threshold, the CPU generates an ENQ_RATE_CONTROL exception for the OS to take an appropriate action. An appropriate action could be allowing the ENQ operation to proceed, deactivating/terminating the PASID or rescheduling the invoking thread or throttling the PASID by mimicking failed ENQCMD/ENQCMDX submission through a ZF (zero-flag), as described above.

Figure 11:
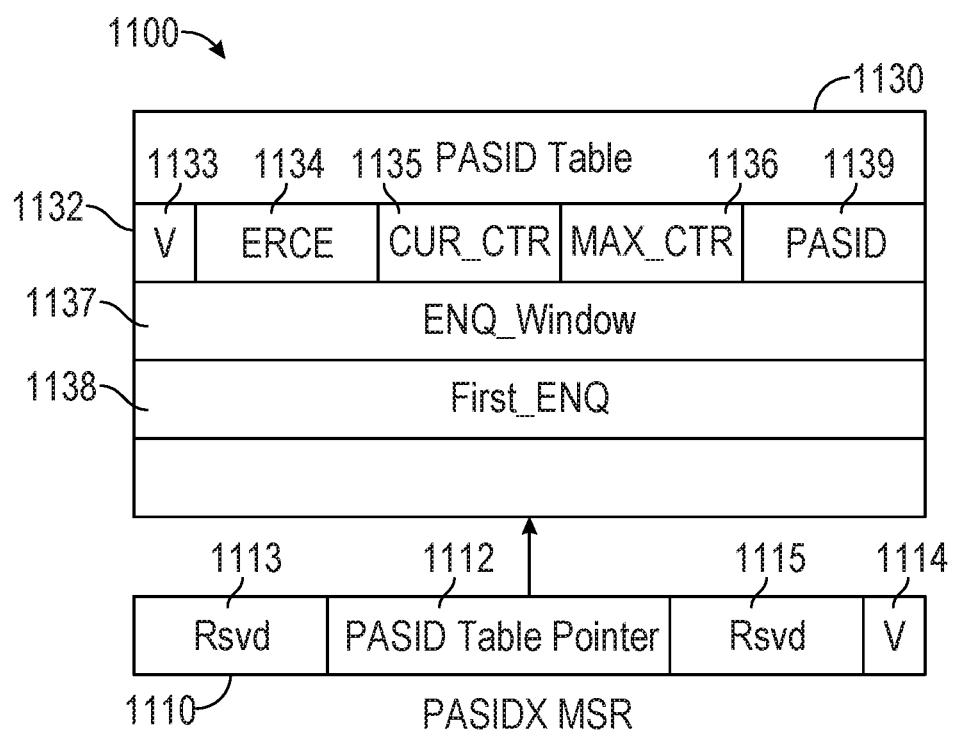
FIG. 11 is a block diagram of a portion of a processor in accordance with yet another embodiment.

Referring now to FIG. 11, shown is a block diagram of a portion of a processor in accordance with yet another embodiment. As shown in FIG. 11, processor 1100 includes a PASIDX MSR 1110 that includes multiple fields. As shown in FIG. 11, MSR 1110 includes a PASID table pointer field 1112 to store a PASID table pointer. In addition, reserved fields 1113, 1115 may be provided, along with a valid field 1114. Using the PASID table pointer, a given entry within a PASID table 1130 may be accessed.

As shown in FIG. 11, rate control parameter fields may be included in a PASID table entry 1132 pointed to by a given page table handle, e.g., obtained from the command data. As shown in FIG. 11, PASID table entry 1132 includes the following rate control parameter fields: ERCE 1134; ENQ_WINDOW 1137; MAX_CTR 1136; CUR_CTR 1135; and FIRST_ENQ 1138. In turn, a specific exception type (ENQ_RATE_CONTROL) is incurred when the ENQ rate is exceeded. In some embodiments, the ENQ_WINDOW field is kept in another MSR (e.g., a PASIDX_RC_MSR), and in other embodiments the ENQ_WINDOW field is replaced with a constant number.

In operation, system software configures the above-described rate control parameter fields with the appropriate values and enables ENQ rate control. For each execution of an ENQCMD/ENQCMDX instruction, microcode may determine whether that execution is in the current window or a new window by examining ENQ rate control fields associated with the PASID in the PASID table. If the instruction was executed in the same window, a counter is decremented to mark appropriate depletion of a quota for a given window. When this quota is fully depleted (e.g., the counter reaches zero), an ENQ rate control exception occurs for the given thread. If microcode determines that the execution of the instruction is in a new window, it repopulates the quota by resetting the counter to its original value.

Figure 12:
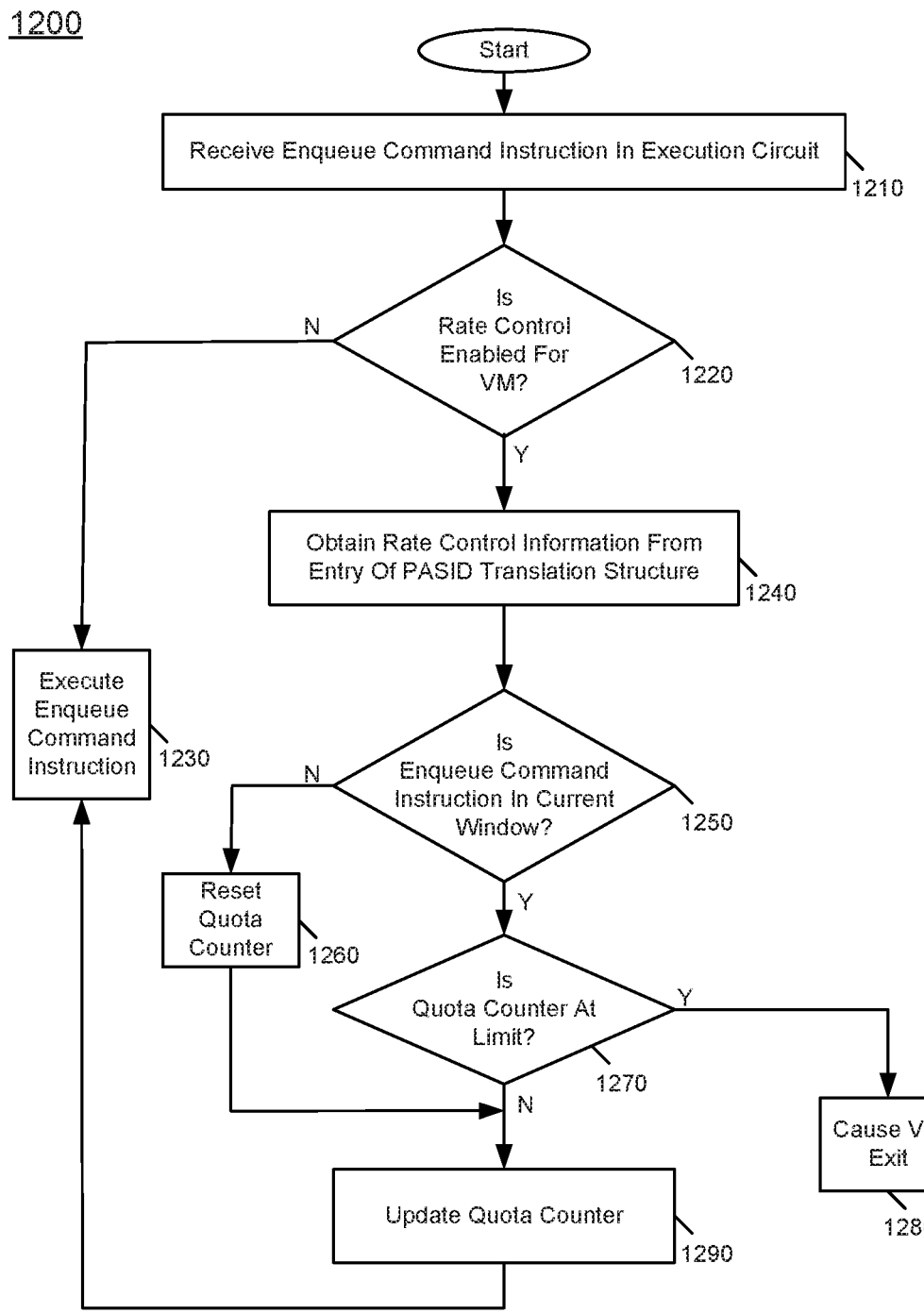
FIG. 12 is a flow diagram of a method in accordance with a still further embodiment.

Referring now to FIG. 12, shown is a flow diagram of a method in accordance with a still further embodiment. As shown in FIG. 12, method 1200 is a method for performing rate control for enqueue command handling in a processor. As such, method 800 may be performed by, e.g., interface circuitry of a processor, and/or other hardware circuitry, firmware, microcode, a combination thereof or the like.

As illustrated, method 1200 begins by receiving an enqueue command instruction in an execution circuit (block 1210). Next it is determined at diamond 1220 whether rate control is enabled for a VM that issued the instruction. If not, control passes to block 1230 where the enqueue command is directly executed. Such execution may occur as described above.

Instead if it is determined that rate control is enabled for the VM, control passes to block 1240 where rate control information may be obtained from an entry of a PASID translation structure. This rate control information may include various parameters as discussed above. Using this information, next it may be determined whether the enqueue command is within a current instruction window (block 1250). If not, at block 1260 a quota counter is reset to an original value, and control passes block 1290 where the quota counter may be updated (e.g., decremented). Thereafter, the enqueue command instruction may execute (block 1230). Instead if it is determined at diamond 1250 that the enqueue command is within the current window, next it is determined at diamond 1270 whether the quota counter is at its limit. If so, a VM exit is caused (block 1280). As a result, appropriate handling may occur, e.g., within a hypervisor. Otherwise if the quota counter is not at limit, the quota counter may be updated (e.g., decremented) at block 1290 and the enqueue command instruction executed at block 1230. Understand while shown at this high level in the embodiment of FIG. 12, many variations and alternatives are possible.

Embodiments thus enable fine-grain QoS or rate control for enqueue-based scalable work-submissions. In this way, fair sharing may be realized among a large number of clients submitting the work submissions. Still further, embodiments may realize such operation without any interconnect fabric or device-side changes.

Figure 13A:
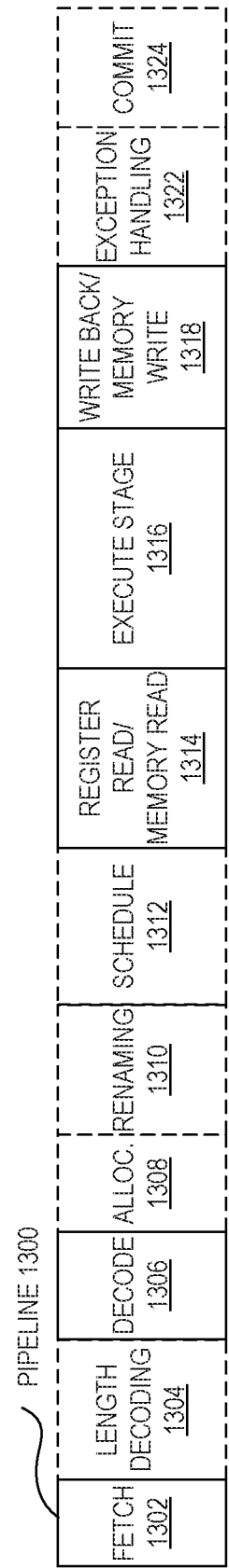
FIGS. 13A and 13B illustrate a block diagram of a more specific exemplary in-order core architecture.
Figure 13B:
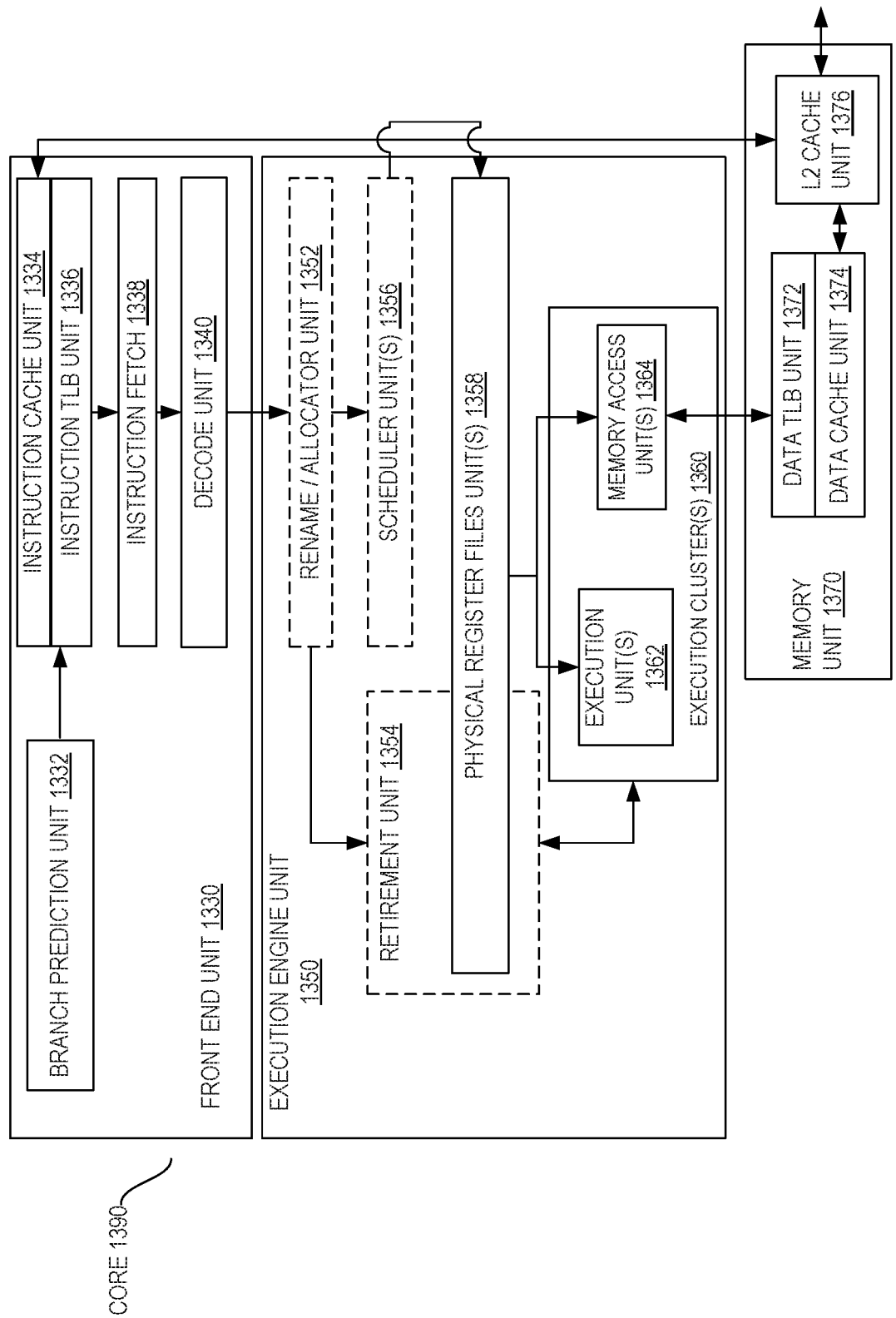

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A and 13B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324. Note that as described herein, in a given embodiment a core may include multiple processing pipelines such as pipeline 1300.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 14:
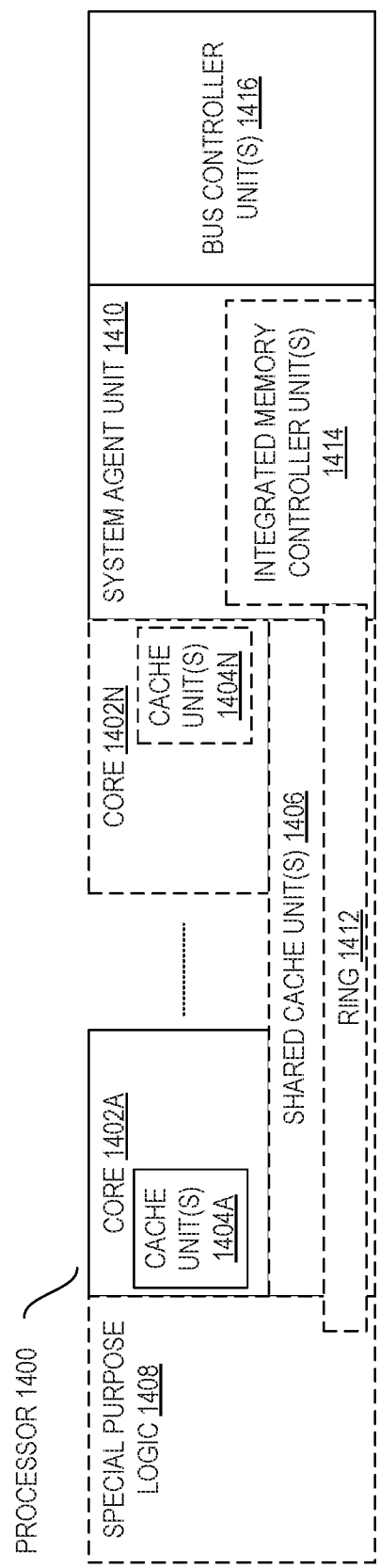
FIG. 14 is a block diagram of a processor that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache units 1404A-N within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the special purpose logic 1408, the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402 A-N.

The system agent unit 1410 includes those components coordinating and operating cores 1402A-N. The system agent unit 1410 may include for example a power control unit (PCU) and a display unit. The PCU may be or include logic and components needed for regulating the power state of the cores 1402A-N and the special purpose logic 808. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Figure 15:
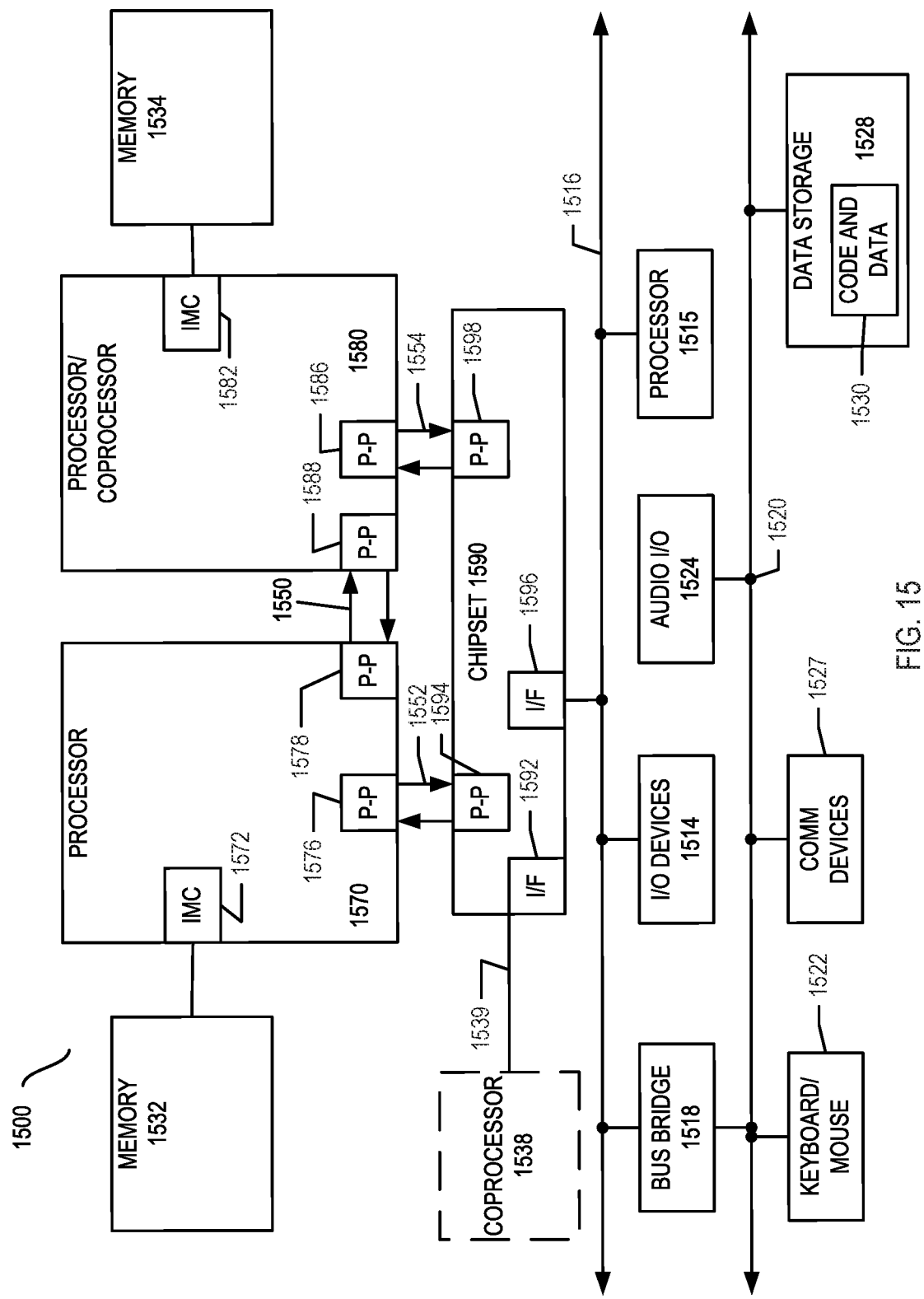
FIG. 15 is a block diagram of a first more specific exemplary system in accordance with an embodiment of the present invention
Figure 16:
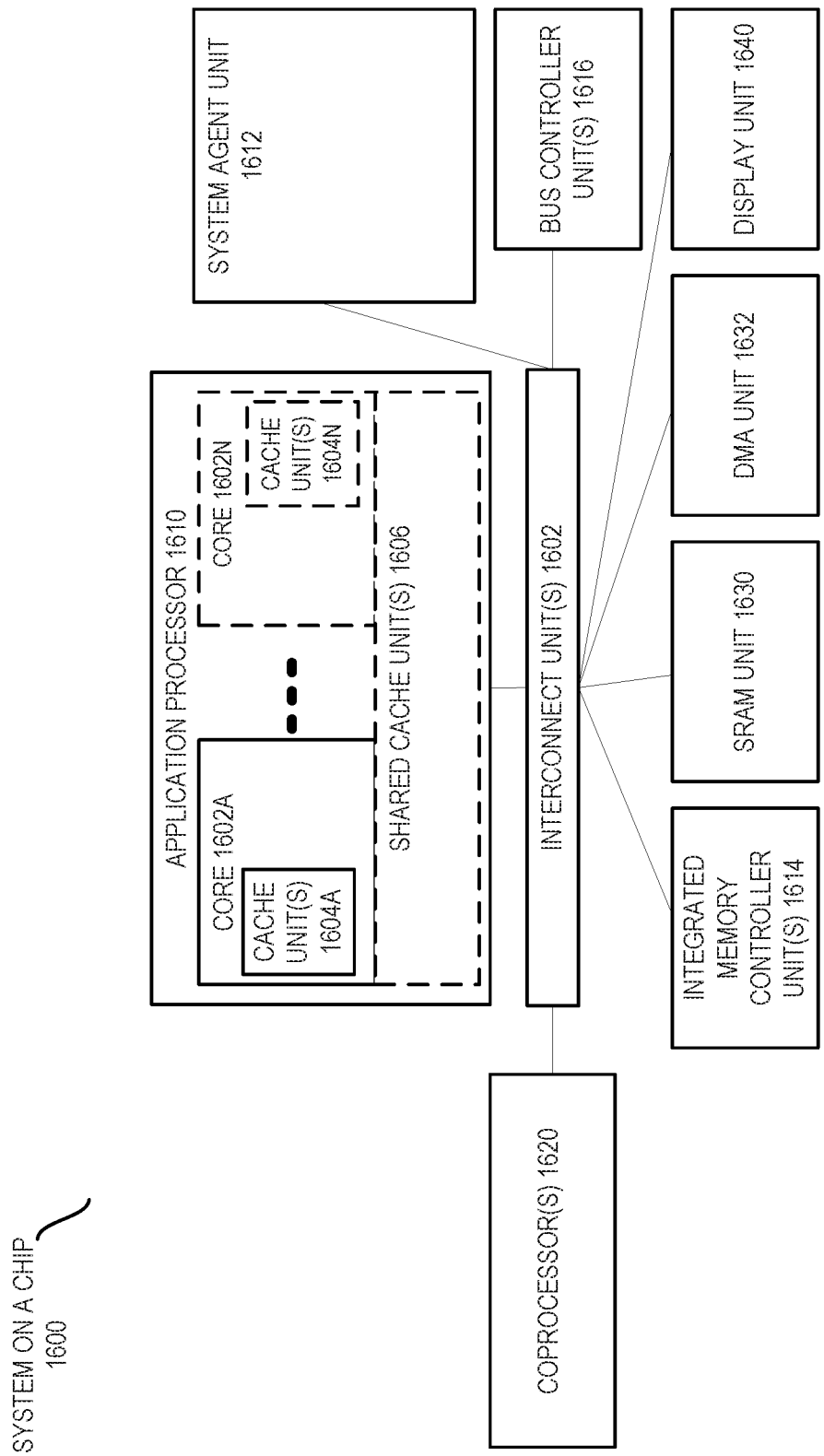
FIG. 16 is a block diagram of a SoC in accordance with an embodiment of the present invention.

FIGS. 15-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1500.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Referring now to FIG. 16, shown is a block diagram of a SoC 1600 in accordance with an embodiment of the present invention. Dashed lined boxes are optional features on more advanced SoCs. In FIG. 16, an interconnect unit(s) 1602 is coupled to: an application processor 1610 which includes a set of one or more cores 1602A-N (including constituent cache units 1604A-N) and shared cache unit(s) 1606; a system agent unit 1612; a bus controller unit(s) 1616; an integrated memory controller unit(s) 1614; a set or one or more coprocessors 1620 which may include integrated graphics logic, an image processor, an audio processor, and a video processor; a static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
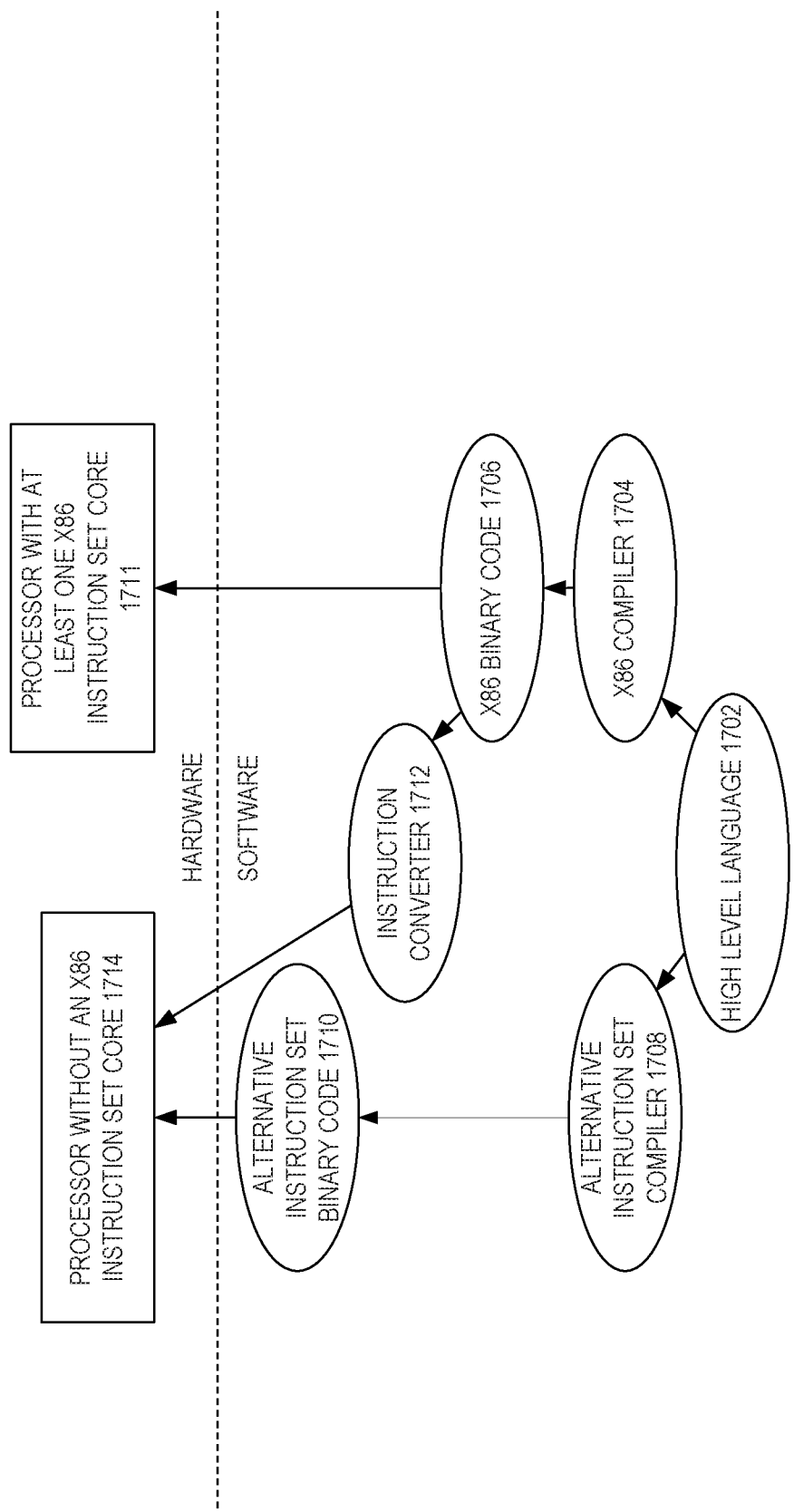
FIG. 17 is a block diagram contrasting the use of a software instruction converter to convert binary instructions in a source instruction set to binary instructions in a target instruction set according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x186 instruction set core 1716. Similarly, FIG. 17 shows the program in the high level language 1702 may be compiled using an alternative instruction set compiler 1108 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

The following examples pertain to further embodiments.

In one example, a processor comprises: a first configuration register to store QoS information for a PASID value associated with a first process; and an execution circuit coupled to the first configuration register, The execution circuit, in response to a first instruction, is to obtain command data from a first location identified in a source operand of the first instruction, insert the QoS information and the PASID value into the command data, and send a request comprising the command data to a device coupled to the processor, to enable the device to use the QoS information of a plurality of requests to manage sharing between a plurality of processes.

In an example, the execution circuit is to send the command data to a register of the device identified in a destination operand of the first instruction.

In an example, the first configuration register further is to store the PASID value.

In an example, the processor further comprises a second configuration register to store the PASID value.

In an example, the QoS information comprises a class value and a priority value.

In an example, the device comprises an I/O device to store the request in a first queue associated with a first class based on the class value, and select, based on the priority value, the request from a plurality of requests in the first queue for delivery to a processing circuit of the device.

In an example, the processor is to receive a retry request from the device for the request when a QoS quota associated with the class value is exhausted.

In another example, a method comprises: receiving, in an execution circuit of a processor, a first instruction to send a work submission to a device coupled to the processor; obtaining rate control information from an entry of a PASID table, the entry associated with a process that issued the first instruction; determining whether the process has available capacity within a current window to complete the first instruction, based at least in part on the rate control information; and in response to determining that the process has the available capacity, sending the work submission to the device.

In an example, the method further comprises, in response to determining that the process does not have the available capacity, causing a virtual machine exit of the process.

In an example, the method further comprises, in response to the virtual machine exit, disabling the process and scheduling a new process for execution.

In an example, the method further comprises obtaining the rate control information in response to determining that rate control is enabled for the process, and not obtaining rate control information associated with a second process in response to determining that the rate control is not enabled for the second process.

In an example, the method further comprises: accessing the PASID table using a pointer obtained from one of a first configuration register and a translation structure; indexing into a first entry of the PASID table using a PASID table handle included in command data obtained in response to the first instruction obtaining a PASID value from the first entry; and inserting the PASID value into the command data and sending the command data in the work submission to the device.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a device comprises: an input circuit to receive incoming work submissions from a processor, at least some of the incoming work submissions comprising QoS information including a QC value and a QP value; a first queue coupled to the input circuit, the first queue associated with a first QC value; a second queue coupled to the input circuit, the second queue associated with a second QC value, wherein the input circuit is to store an incoming work submission into one of the first queue and the second queue based at least in part on the QC value of the incoming work submission; and a priority circuit coupled to the first queue and the second queue, where the priority circuit is to select a first incoming work submission stored in the first queue to provide to one of a plurality of destinations based at least in part on the QP value of the first incoming work submission, the first incoming work submission associated with a first process.

In an example, the priority circuit is to select the first incoming work submission ahead of a second incoming work submission stored in the first queue, the QP value of the first incoming work submission having a higher priority than a QP value of the second incoming work submission, the second work submission associated with a second process.

In an example, the priority circuit is to send the first incoming work submission to a first destination comprising a first function engine.

In yet another example, a system comprises a processor, a device and a system memory coupled to the processor. The processor comprises: an execution circuit, in response to a first instruction, to obtain command data from a first location identified in a source operand of the first instruction, access an entry of a PASID table using a handle included in the command data and a pointer to obtain a PASID value and QoS information associated with an issuer of the first instruction, insert the PASID value and the QoS information into the command data and send a request comprising the command data to a device. The device is coupled to the processor, and comprises: a front end circuit to receive and handle the request based at least in part on the QoS information, the front end circuit including a plurality of registers, where the front end circuit is to select the command data of the request to send to a first processing circuit of the device based at least in part on the QoS information, In an example, the device comprises an I/O device to send a retry request to the processor for a second request based at least in part on QoS information of the second request, and not store command data of the second request in any of the plurality of registers.

In an example, the QoS information comprises a QC value and a QP value.

In an example, the device further comprises: a first queue associated with a first QC class value; and a second queue associated with a second QC class value, wherein the front end circuit is to store the request into one of the first queue and the second queue based at least in part on the QC value of the request; and a priority circuit coupled to the first queue and the second queue, wherein the priority circuit is to select the request to send to the first processing circuit based at least in part on the QP value of the request.

In an example, the processor is to obtain the pointer from a translation structure, wherein when the QoS information in the PASID table comprises guest QoS information, the processor is to convert the guest QoS information into host QoS information based at least in part on translation information and insert the host QoS information into the command data.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical carriers, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a first configuration register to store quality of service (QoS) information for a process address space identifier (PASID) value associated with a first process; and
   an execution circuit coupled to the first configuration register, wherein the execution circuit, in response to a first instruction, is to obtain command data from a first location identified in a source operand of the first instruction, insert the QoS information and the PASID value into the command data, and send a request comprising the command data to a device coupled to the processor, to enable the device to use the QoS information of a plurality of requests to manage sharing between a plurality of processes, wherein the QoS information comprises a class value and a priority value and the device comprises an input/output (I/O) device, the I/O device to store the request in a first queue associated with a first class based on the class value, and select, based on the priority value, the request from a plurality of requests in the first queue for delivery to a processing circuit of the device.

2. The processor of claim 1, wherein the processor is to receive a retry request from the device for the request when a QoS quota associated with the class value is exhausted.

3. The processor of claim 1, wherein the execution circuit is to send the command data to a register of the device identified in a destination operand of the first instruction.

4. The processor of claim 1, wherein the first configuration register further is to store the PASID value.

5. The processor of claim 1, further comprising a second configuration register to store the PASID value.

6. A device comprising:
   an input circuit to receive incoming work submissions from a processor, at least some of the incoming work submissions comprising quality of service (QoS) information including a quality class (QC) value and a quality priority (QP) value;
   a first queue coupled to the input circuit, the first queue associated with a first QC value;
   a second queue coupled to the input circuit, the second queue associated with a second QC value, wherein the input circuit is to store an incoming work submission into one of the first queue and the second queue based at least in part on the QC value of the incoming work submission; and
   a priority circuit coupled to the first queue and the second queue, wherein the priority circuit is to select a first incoming work submission stored in the first queue to provide to one of a plurality of destinations based at least in part on the QP value of the first incoming work submission, the first incoming work submission associated with a first process.

7. The device of claim 6, wherein the priority circuit is to select the first incoming work submission ahead of a second incoming work submission stored in the first queue, the QP value of the first incoming work submission having a higher priority than a QP value of the second incoming work submission, the second incoming work submission associated with a second process.

8. The device of claim 6, wherein the priority circuit is to send the first incoming work submission to a first destination comprising a first function engine.

9. A system comprising:
   a processor comprising:
      an execution circuit, in response to a first instruction, to obtain command data from a first location identified in a source operand of the first instruction, access an entry of a process address space (PASID) table using a handle included in the command data and a pointer to obtain a PASID value and quality of service (QoS) information associated with an issuer of the first instruction, insert the PASID value and the QoS information into the command data and send a request comprising the command data to a device;

the device coupled to the processor, wherein the device comprises:

a front end circuit to receive and handle the request based at least in part on the QoS information, the front end circuit including a plurality of registers, wherein the front end circuit is to select the command data of the request to send to a first processing circuit of the device based at least in part on the QoS information; and a system memory coupled to the processor.

10. The system of claim 9, wherein the device comprises an input/output (I/O) device, the I/O device to send a retry request to the processor for a second request based at least in part on QoS information of the second request, and not store command data of the second request in any of the plurality of registers.

11. The system of claim 9, wherein the QoS information comprises a quality class (QC) value and a quality priority (QP) value.

12. The system of claim 11, wherein the device further comprises:

a first queue associated with a first QC class value; and a second queue associated with a second QC class value, wherein the front end circuit is to store the request into one of the first queue and the second queue based at least in part on the QC value of the request; and a priority circuit coupled to the first queue and the second queue, wherein the priority circuit is to select the request to send to the first processing circuit based at least in part on the QP value of the request.

13. The system of claim 11, wherein the processor is to obtain the pointer from a translation structure, wherein when the QoS information in the PASID table comprises guest QoS information, the processor is to convert the guest QoS information into host QoS information based at least in part on translation information and insert the host QoS information into the command data.

\* \* \* \* \*